US012554966B2

(12) United States Patent
Rosemarine

(10) Patent No.: US 12,554,966 B2
(45) Date of Patent: Feb. 17, 2026

(54) NEURAL NETWORK PROCESSING

(71) Applicant: Arm Limited, Cambridge (GB)

(72) Inventor: Elliot Maurice Simon Rosemarine, London (GB)

(73) Assignee: Arm Limited, Cambridge (GB)

( * ) Notice: Subject to any disclaimer, the term of this patent is extended or adjusted under 35 U.S.C. 154(b) by 664 days.

(21) Appl. No.: 17/986,813

(22) Filed: Nov. 14, 2022

(65) Prior Publication Data
US 2024/0160889 A1 May 16, 2024

(51) Int. Cl.
*G06N 3/00* (2023.01)
*G06N 3/04* (2023.01)
*G06N 3/045* (2023.01)
*G06N 3/048* (2023.01)
*G06N 3/0495* (2023.01)
*G06N 3/088* (2023.01)
*G06N 20/00* (2019.01)
*G06N 20/10* (2019.01)

(52) U.S. Cl.
CPC ............... *G06N 3/04* (2013.01); *G06N 3/045* (2023.01); *G06N 3/048* (2023.01); *G06N 3/0495* (2023.01); *G06N 3/088* (2013.01); *G06N 20/00* (2019.01); *G06N 20/10* (2019.01)

(58) Field of Classification Search
CPC .......... G06N 3/04; G06N 3/045; G06N 3/088; G06N 3/048–049; G06N 3/082; G06N 3/096; G06N 3/08; G06N 3/0495; G06N 20/00; G06N 20/10; G06F 16/1744
See application file for complete search history.

(56) References Cited

U.S. PATENT DOCUMENTS

| 8,965,819 | B2 * | 2/2015 | Tirunagari | G06F 12/121 706/15 |
|---|---|---|---|---|
| 2016/0217369 | A1 * | 7/2016 | Annapureddy | G06N 3/082 |
| 2019/0081637 | A1 * | 3/2019 | Pool | G06N 5/046 |
| 2020/0066006 | A1 * | 2/2020 | Dwivedi | G16H 30/40 |
| 2020/0366914 | A1 * | 11/2020 | Schroers | H04N 19/513 |
| 2021/0216464 | A1 * | 7/2021 | Uhrenholt | G06F 12/0891 |

(Continued)

FOREIGN PATENT DOCUMENTS

| WO | WO2019245805 A1 * | 12/2019 |
| WO | 2020231691 A1 * | 11/2020 |
| WO | WO2022146523 A1 * | 7/2022 |

OTHER PUBLICATIONS

Haval T. Sadeeq et al., "Image Compression Using Neural Networks: A Review", iJOE—vol. 17, No. 14, 2021, pp. 135-153.*

(Continued)

*Primary Examiner* — Srirama Channavajjala
(74) *Attorney, Agent, or Firm* — Pearl Cohen Zedek Latzer Baratz LLP

(57) ABSTRACT

A data processor is disclosed that includes a processing unit operable to process neural network data, and a cache system operable to cache neural network data for the processing unit. When neural network data is required for processing, the processing unit issues a request for the neural network data to the cache system, and if the requested data is not cached in the cache system, a compression codec is caused to decode a part of a compressed neural network data stream that encodes the requested neural network data so as to provide the requested neural network data.

13 Claims, 13 Drawing Sheets

(56) References Cited

U.S. PATENT DOCUMENTS

| | | | |
|---|---|---|---|
| 2021/0224191 A1* | 7/2021 | Wang | G06F 12/0813 |
| 2021/0390383 A1* | 12/2021 | Gu | G06N 3/04 |
| 2023/0096567 A1* | 3/2023 | Nalci | H04N 19/42 |
| | | | 375/240.03 |
| 2023/0325357 A1* | 10/2023 | More | G06N 3/088 |
| | | | 707/693 |

OTHER PUBLICATIONS

Yu-Chao Zhou et al., "An Enhanced Data Cache with In-Cache Processing Units for Convolutional Neural Network Accelerators", 2020 IEEE 15th International Conference on Solid-State & Integrated Circuit Technology (ICSICT), Nov. 2020, pp. 1-3.*

Cramer, C et al., "Video compression with random neural networks", Proceedings of International Workshop on Neural Networks for Identification, Control, Robotics and Signal/Image Processing, Aug. 1996, pp. 476-484.*

\* cited by examiner

| 701 | 702 | 703 |
|---|---|---|
| Address | State | Data |
| Address | State | Data |
| Address | State | Data |
| ... | ... | .... |

| 701 | 702 | 703 |
|---|---|---|
| Address, ASID | State | Data |
| Address, ASID | State | Data |
| Address, ASID | State | Data |
| ... | ... | .... |

| 711 | 712 | 713 |
|---|---|---|
| X,Y,D,Z,TID | State | Decompressed NN data |
| X,Y,D,Z,TID | State | Decompressed NN data |
| X,Y,D,Z,TID | State | Decompressed NN data |
| ... | ... | .... |

NEURAL NETWORK PROCESSING

BACKGROUND

The technology described herein relates to data processors, such as graphics processors and central processing units, and in particular to neural network processing in such processors.

Neural networks can be used for processes such as machine learning, computer vision, and natural language processing operations. It is becoming increasingly common for neural networks to be employed in portable electronic devices, such as mobile phones, tablets and other devices for these purposes.

Neural networks generally comprise a number of layers which each process an input data array to provide an output data array (which becomes the input data array for the next layer). The layers, acting one after the other, may be able to process complex data (e.g. image or sound data) to provide a desired output (e.g. the identification of an object within an image, or a spoken word within a sound clip, or some other usable output inferred from the input data). This process is usually known as "inferencing" or "classification".

The different layers of a neural network may perform different operations on the input data arrays that they receive.

For example, one common neural network layer operation is a convolution operation, which may be performed by a convolution layer of a convolutional neural network (CNN). A convolution operation may typically be performed by performing a discrete convolution between an input array of data (feature map) and a convolution kernel that comprises an array of data elements, with each data element of the array representing a "weight". Each weight value may be determined, for example, during training of the neural network.

It can be the case that the features map and/or weight data to be used when executing a given neural network comprises a relatively large amount of data, and is too large to be retained in its entirety in local, on chip storage, such that the data will need to be fetched from main memory when it is to be used. Accordingly, the use of feature map and/or weight data during neural network execution may involve a large amount of data being transferred to and from memory.

The Applicants believe that there remains scope for improvements to the processing of neural networks on electronic devices.

BRIEF DESCRIPTION OF THE DRAWINGS

Embodiments of the technology described herein will now be described by way of example only and with reference to the accompanying drawings, in which:

FIGS. 7A, 7B and 7C show schematically data caches in accordance with embodiments of the technology described herein;

Like reference numerals are used for like components where appropriate in the drawings.

DETAILED DESCRIPTION

Figure 1:
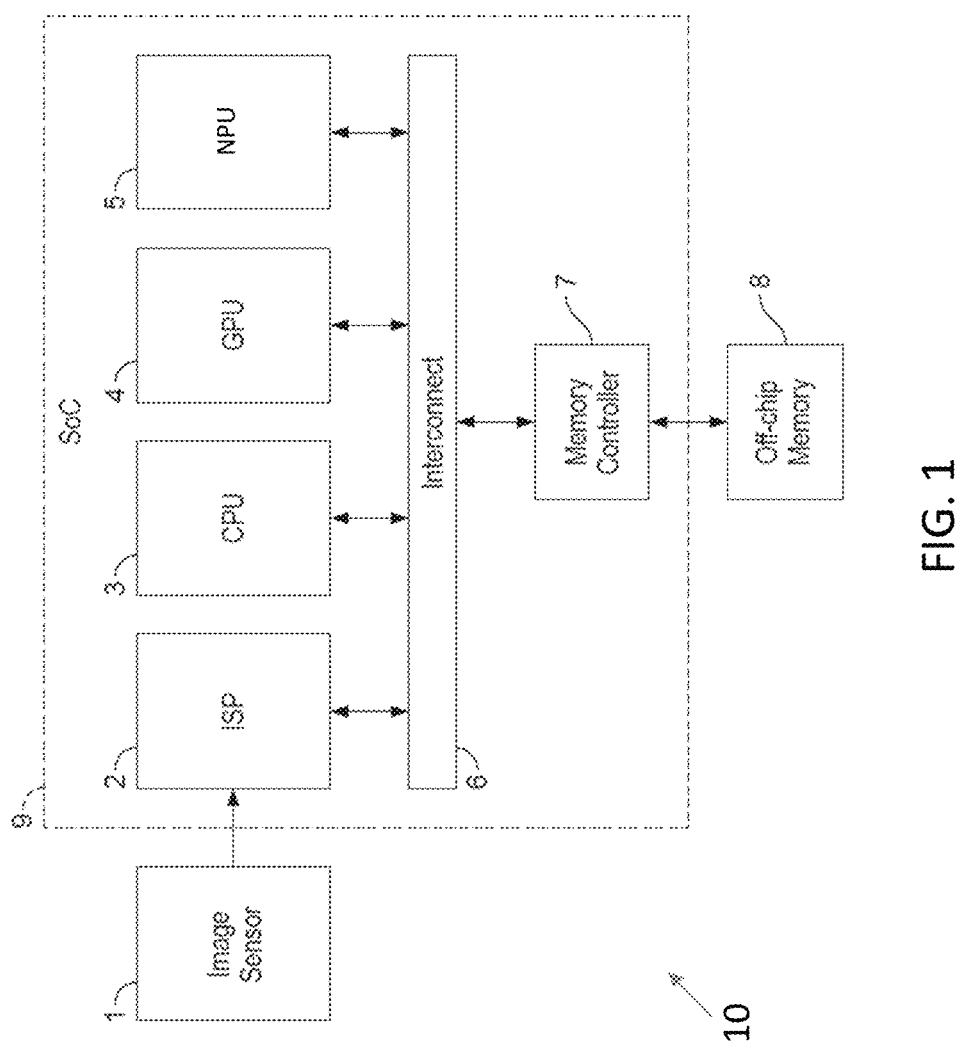
FIG. 1 shows a data processing system which can be operated in accordance with an embodiment of the technology described herein.

A first embodiment of the technology described herein comprises a method of operating a data processor that comprises:

one or more processing units operable to process neural network data;

a cache system operable to cache neural network data for the one or more processing units; and one or more compression codecs operable to decode compressed neural network data streams encoding neural network data to provide decompressed neural network data;

the method comprising, when a processing unit of the one or more processing units requires neural network data for processing:

the processing unit issuing a request for the neural network data to the cache system, and the cache system in response to the request:

determining whether the requested neural network data is cached in the cache system in decompressed form; and when it is not determined that the requested neural network data is cached in the cache system in decompressed form:

causing a compression codec of the one or more compression codecs to decode a part of a compressed neural network data stream that encodes the requested neural network data so as to provide the requested neural network data in decompressed form; and providing the requested neural network data to the processing unit.

A second embodiment of the technology described herein comprises a data processor comprising:

one or more processing units operable to process neural network data;

a cache system operable to cache neural network data for the one or more processing units; and one or more compression codecs operable to decode compressed neural network data streams encoding neural network data to provide decompressed neural network data;

wherein the one or more processing units are configured to, when neural network data is required for processing, issue a request for the neural network data to the cache system; and the cache system is configured to, in response to a request for neural network data from a processing unit of the one or more processing units:

determine whether the requested neural network data is cached in the cache system in decompressed form; and when it is not determined that the requested neural network data is cached in the cache system in decompressed form:

cause a compression codec of the one or more compression codecs to decode a part of a compressed neural network data stream that encodes the requested neural network data so as to provide the requested neural network data in decompressed form; and provide the requested neural network data to the processing unit.

Embodiments of the technology described herein relate to a data processor, such as a central processing unit (CPU) or a graphics processing unit (GPU), that includes one or more compression codecs that decompress compressed neural network data streams to provide decompressed neural network data for processing by one or more processing units (cores) (e.g. programmable execution units) of the data processor.

In the technology described herein, the data processor is provided with a cache system that can (and in embodiments does) cache neural network data decompressed by the one or more compression codecs. Thus, in embodiments of the technology described herein, when it is determined that the requested neural network data is (validly) cached in the cache system in decompressed form (in response to a "cache hit"), the cache system returns the requested neural network data to the requesting processing unit (without triggering a decompression operation by any of the one or more compression codecs).

The inventor has recognised that caching decompressed neural network data can facilitate re-use of decompressed neural network data, and thus a reduction in the number of decompression operations that the one or more compression codecs may otherwise need to perform. Caching can moreover facilitate a reduction in an amount of data transferred to and from memory, and thus bandwidth requirements. The inventor has found that such reductions can be particularly significant in the case of neural network processing, since neural network processing can commonly involve the repeated re-use of the same data. For example, in a convolution operation the same convolution kernel is repeatedly applied to different regions of a data array (feature map).

Furthermore, in embodiments of the technology described herein, the cache system and the one or more compression codecs are integrated such that in response to a "cache miss", the cache system triggers a decompression operation at an appropriate point in a neural network data stream that encodes the "missing" data. This can then allow decompression and read operations to be triggered only when, and to the extent, necessary, and thus minimise processing and bandwidth requirements.

It will be appreciated, therefore, that the technology described herein can facilitate particularly efficient sharing and re-use of decompressed neural network data, and thus provide an improved data processor.

The technology described herein may be used when processing any suitable and desired neural network. In embodiments, the neural network is a convolutional neural network (CNN).

The neural network can process any suitable input to produce a useful output. For instance, the input may comprise, an image, such as an image from an Image Signal Processor (ISP) or an image frame from video data, sound data or voice data, or other input data. Correspondingly the neural network may be operable to identify or classify features present within the input, e.g. such as objects in an input image, or sound features in input sound data.

The neural network in embodiments comprises one or more, and in embodiments a plurality, of layers, which operate in turn, e.g. such that the output data for one layer becomes the input layer for a next layer. The layers of the neural network may, and in embodiments do, comprise one or more convolution layers, pooling layers and/or fully connected layers. The layers of the neural network may be represented by tensor data structures.

The technology described herein can be used for any suitable form of neural network processing, such as to generate a (useful) output as may be output during inferencing by the neural network, but also during training of the neural network.

Embodiments of the technology described herein relate particularly to the performance of neural network processing operations that repeatedly re-use the same data, such as convolution or pooling operations.

A convolution (or pooling) operation (performed by a processing unit of the data processor) in embodiments comprises a discrete convolution operation performed between an input data array (feature map) and a convolution (filter) kernel to generate an output data array (feature map).

An input or output data array (feature map) can be any suitable array (tensor) of data elements, and can have any suitable size and number of dimensions. One dimension of a feature map may correspond to a channel dimension. For instance, in the case of two-dimensional image data, an (input) data array may comprise a three dimensional array of data elements, with two dimensions of the array corresponding to the two dimensions of the image, and the third dimension of the array corresponding to colour channels of the image.

A convolution kernel can be provided as desired. In embodiments, a convolution kernel is provided as a suitable array of data elements, with each data element of the array representing a respective "weight". A (each) weight value of a convolution kernel may be provided as desired. For example, and in embodiments, each weight value of a convolution kernel is determined during neural network training, in any suitable manner.

Thus, in embodiments, the neural network data (requested by the processing unit, cached in the cache system, and encoded by a compressed neural network data stream) comprises feature map and/or weight data. In embodiments, the processing unit processes the neural network (feature map and/or weight) data it receives so as to perform a neural network processing operation, such as a convolution (or pooling) operation.

The data processor can comprise any suitable and desired processor, such as a neural network processing unit (NPU). The data processor is in embodiments a data processor that is not specifically configured for performing neural network processing, such as a central processing unit (CPU), a graphics processor (GPU) or a digital signal processor (DSP) (in other words the data processor is in embodiments not a neural network processing unit (NPU)). The inventor has found that embodiments of the technology described herein can facilitate efficient sharing and re-use of decompressed neural network data particularly in the context of a data processor that is not specifically configured for performing neural network processing.

The data processor may be a single or multi-cored data processor. Thus, the one or more processing units (cores) are in embodiments plural processing units (cores), such as 2, 4, 8, 16, 32, etc., processing cores.

The data processor in embodiments is part of an overall data processing system that includes the data processor and a memory. In embodiments, the cache system is operable to cache data stored in the memory for the data processor. The data processor (and in embodiments each processing unit) is thus, in embodiments, operable to receive data from the memory by reading from the cache system, and/or to send data to the memory by writing to the cache system.

The memory can comprise any suitable memory (of the data processing system), and may be configured in any suitable and desired manner. In embodiments, it is a main memory of the data processing system. In embodiments, it is a memory that is off chip from the data processor, i.e. an external (main) memory (external to the data processor).

The cache system can be arranged in any suitable and desired manner. The cache system should be, and in embodiments is, operable to transfer (neural network) data between the memory and each of the one or more processing units (cores) of the data processor.

The cache may be a single level cache system, but in embodiments is a (in embodiments hierarchical) multi-level cache system. Thus, in embodiments, in response to a request for data from a processing unit (core) of the data processor, the cache system first determines whether the requested data is (validly) cached at a lowest level of the cache system. In embodiments, if it is determined that the requested data is not (validly) cached at a lowest level of the cache system, it is determined whether the requested data is (validly) cached at a next (higher) level of the cache system (and so on). In embodiments, if the data is not (validly) cached at any level of the cache system, (e.g. compressed) data may be fetched from memory. Requested data (validly) cached at a cache level of the cache system is in embodiments returned to the requesting processing unit (core) (in embodiments via any lower cache levels). (It will be appreciated here that a lower cache level will be (logically) closer to (a processing unit (core) of) the data processor, whereas a higher cache level will be (logically) closer to the memory.)

In embodiments, the cache system comprises one or more lower, "private" cache levels, and one or more higher, "shared" cache levels. In embodiments, a private cache level comprises one or more private caches, wherein each private cache is associated with (only) a respective one of the one or more processing units (cores) of the data processor. In embodiments, a shared (common) cache level comprises one or more shared caches, wherein each shared cache is associated with all of the one or one or more processing units (cores) of the data processor. The cache system may (further) comprise one or more intermediate, "partially shared" cache levels (logically) in between lower (private) and higher (shared) cache levels, comprising one or more partially shared caches, wherein each partially shared cache is associated with some but not all of the one or one or more processing units (cores) of the data processor. In embodiments, a highest level shared cache is in (direct) communication with the memory, and a lowest level private cache is in (direct) communication with a respective processing unit (core) of the data processor.

For example, and in embodiments, the cache system comprises one or more level 1 (L1) caches, wherein each processing unit (core) has (direct) access to a respective one of the one or more level 1 (L1) caches. In embodiments, the cache system further comprises a level 2 (L2) cache in communication with each of the L1 caches (and the memory). Other levels of the cache system would be possible. For example, the cache system could comprise a level 0 (L0) and/or level 3 (L3) cache.

A (and in embodiments each) cache of the cache system should, and in embodiments does, comprise a respective set of cache entries, such as and in embodiments, a respective set of cache lines. Each cache entry (e.g. cache line) in the cache system in embodiments has the same (fixed) size, such as 16 bytes, 32 bytes, 64 bytes, 128 bytes, 256 bytes, etc. A (and in embodiments each) cache entry (e.g. cache line) should, and in embodiments does, include respective data that the cache entry caches. A (and in embodiments each) cache entry (e.g. cache line) in embodiments further comprises state information indicating a status of the cache entry, such as, and in embodiments, whether the respective data is valid or invalid, and/or whether or not the respective data is "dirty", and/or whether or not the respective data is cached by another cache of the cache system (i.e. whether the data is "shared" or "unique"), etc.

A (and in embodiments each) cache entry (e.g. cache line) should, and in embodiments does, include a suitable identifier, e.g. tag, that identifies the data that the cache entry is for. A cache entry identifier (tag) can be provided in any suitable form. In embodiments, a cache entry identifier (tag) indicates a physical or virtual address corresponding to a location in the memory where data cached by the cache entry is stored. All cache entries in the cache system could be identified (e.g. tagged) based on such memory address-based identifiers (tags). However, in embodiments, cache entries that cache (decompressed) neural network data comprise an identifier (are tagged) based on neural network traversal information (coordinates) associated with the neural network data.

Any suitable neural network coordinates can be used for an identifier (tag). For example, a neural network coordinate based identifier (tag) may indicate a particular (feature map or weight data) data array (tensor) and/or a particular data element of a (feature map or weight data) data array (tensor). In embodiments, a neural network coordinate based identifier (tag) (coordinate) indicates one or more, and in embodiments all, of a neural network position, channel (depth), frame, and layer (tensor). In embodiments, an address space is indicated, for example and in embodiments, by an address space identifier (ASID).

In embodiments, a processing unit (core) issuing a request for neural network data to the cache system comprises the processing unit issuing a request for the neural network data to the cache system that indicates one or more neural network coordinates associated with the requested neural network data, and it is determined (by the cache system) whether the requested neural network data is (validly) cached in the cache system (in decompressed form) by determining whether a data cache of the cache system includes a (valid) cache entry that is identified (tagged) by an identifier (tag) that corresponds to the one or more neural network coordinates indicated by the request. The data processor may maintain appropriate information to map neural network coordinates to compressed neural network data streams, and this information may be used in the determination.

These arrangements can facilitate particular quick and convenient retrieval of decompressed neural network data.

It is believed that the idea of identifying (tagging) cache entries that cache neural network data based on coordinates of the neural network data may be novel and inventive in its own right. Thus, an embodiment of the technology described herein comprises a method of operating a data processor that comprises:

one or more processing units operable to process neural network data; and a cache system operable to cache neural network data for the one or more processing units;

wherein the cache system includes one or more neural network coordinate based caches operable to identify cache entries based on one or more neural network coordinates;

the method comprising:

a processing unit of the one or more processing units issuing a request for neural network data to the cache system that indicates one or more neural network coordinates associated with the requested neural network data; and the cache system determining whether the requested neural network data is (validly) cached in the cache system by determining whether the one or more neural network coordinate based caches include a (valid) cache entry that is identified based on the one or more neural network coordinates indicated by the request.

An embodiment of the technology described herein comprises a data processor comprising:

one or more processing units operable to process neural network data; and a cache system operable to cache neural network data for the one or more processing units, wherein the cache system includes one or more neural network coordinate based caches operable to identify cache entries based on one or more neural network coordinates;

wherein the one or more processing units are configured to issue requests for neural network data to the cache system that indicate one or more neural network coordinates associated with the requested neural network data; and the cache system is configured to, in response to a request for neural network data that indicates one or more neural network coordinates associated with the requested neural network data, determine whether the requested neural network data is (validly) cached in the cache system by determining whether the one or more neural network coordinate based caches include a (valid) cache entry that is identified based on the one or more neural network coordinates indicated by the request.

These embodiments can, and in embodiments do, include one or more, and in embodiments all, of the features of other embodiments described herein, as appropriate. For example, in embodiments, when it is determined that the one or more caches include a (valid) cache entry that is identified (tagged) by an identifier that corresponds to the one or more neural network coordinates indicated by the request, the data cached by the cache entry is returned to the requesting processing unit. In embodiments, when it is not determined that the one or more caches include a (valid) cache entry that is identified (tagged) by an identifier that corresponds to the one or more neural network coordinates indicated by the request (when it is determined that the one or more caches do not include a (valid) cache entry that is identified based on the one or more neural network coordinates indicated by the request), an appropriate decompression operation is triggered, e.g. as described herein.

A processing unit can be triggered to issue a "neural network coordinate indicating request" in any suitable and desired manner. In embodiments, a processing unit is triggered to issue a neural network coordinate indicating request by a specific instruction included in a program that the processing unit executes. In embodiments, such a neural network coordinate indicating request-triggering instruction is visible to an application program interface (API), e.g. such that a programmer may explicitly include the instruction in (high level) application program code, with a compiler then including a corresponding instruction in the (complied) program to be executed by the processing unit in response thereto.

The cache system could include memory address-based identifiers and neural network coordinate-based identifiers in a same cache. However, in embodiments, the cache system comprises separate caches for memory address-based tagged cache entries and for neural network coordinate-based tagged cache entries.

Thus, in embodiments, the cache system includes one or more memory address based data caches operable to (only) identify (tag) cache entries based (only) on a (physical or virtual) memory address. In embodiments, the cache system (further) includes one or more neural network coordinate based data caches operable to (only) identify (tag) cache entries that cache neural network data based on one or more neural network coordinates associated with the cached neural network data.

In embodiments, the arrangement is such that neural network data streams that encode neural network data are cached in compressed form in a memory address based data cache (and in embodiments stored in memory in compressed form), and decompressed neural network data (provided by a compression codec decoding a neural network data stream) is cached in decompressed form in a neural network coordinate based data cache.

Thus, in embodiments, the cache system caches neural network data in compressed form (as one or more compressed neural network data streams) in one or more of the one or more address based caches, and caches neural network data in decompressed form in one or more of the one or more neural network coordinate based caches.

In embodiments, determining whether requested neural network data is (validly) cached in the cache system in decompressed form comprises determining whether the requested neural network data is (validly) cached in a neural network coordinate based data cache of the cache system. A decompression operation is, in embodiments, triggered when it is determined that the requested neural network data is not (validly) cached in a neural network coordinate based data cache of the cache system.

Correspondingly, requested (decompressed) neural network data is, in embodiments, provided to the requesting processing unit from a neural network coordinate based data cache of the cache system.

In embodiments, when decompression of a compressed neural network data stream is triggered, it is determined whether the compressed neural network data stream is (validly) cached by (a memory address based data cache of) the cache system, and when it is determined that the compressed neural network data stream is not (validly) cached by (a memory address based data cache of) the cache system, the compressed neural network data stream is fetched into (a memory address based data cache of) the cache system from the memory. In embodiments, a compression codec decoding a compressed neural network data stream comprises the compression codec reading the compressed neural network data stream from (a memory address based data cache of) the cache system, decoding the read stream data, and writing resulting decompressed data to (a neural network coordinate based data cache of) the cache system.

Memory address based and neural network coordinate based data caches can be provided at any suitable cache levels of the cache system. In embodiments, to facilitate normal cache behaviour, the cache system comprises one or more memory address based data caches at each cache level of the cache system, e.g. in a normal manner for the cache system in question. The cache system may (further) comprise neural network coordinate based data caches at each level of the cache system, or neural network coordinate based data caches at some but not all cache levels of the cache system. For example, the cache system may comprise one or more neural network coordinate based data caches at a private cache level (e.g. each associated with (only) a respective one of the one or more processing units (cores) of the data processor), and/or one or more neural network coordinate based data caches at a partially shared cache level (e.g. each associated with some but not all of the one or one or more processing units (cores) of the data processor), and/or one or more neural network coordinate based data caches at a shared cache level (e.g. each associated with all of the one or one or more processing units (cores) of the data processor).

In embodiments in which decompressed neural network data is cached (by one or more neural network coordinate based data caches) at a private or partially shared cache level of the cache system, the cache system may comprise a suitable arrangement for sharing cached decompressed neural network data amongst all processing units (cores) of the data processor. For example, and in embodiments, the data processor may comprise a cached neural network data sharing circuit, that is in embodiments provided at a shared level of the cache system. The sharing circuit may maintain information indicating what data is cached by neural network coordinate based data caches at lower cache levels of the cache system. The sharing circuit may operate to maintain cache coherency between neural network coordinate based data caches at lower cache levels of the cache system. In embodiments, the sharing circuit operates based on neural network coordinates, e.g. substantially as described above. The sharing circuit may, for example, be in the form of a directory or snoop filter for neural network data cached by the cache system, e.g. and be able to send and receive messages to pass cached data and/or information regarding cached data between different caches.

In embodiments, the cache system includes a suitable arrangement for invalidating cache entries. In embodiments, to e.g. facilitate processing of a new data stream, the cache system can invalidate all cache entries that cache data for a particular data stream. In embodiments, the cache system is operable to, in response to an invalidation request that indicates a neural network layer or tensor, invalidate all cache entries having an identifier (tag) that indicates the same layer or tensor.

The one or more compression codecs can decode compressed neural network data streams to provide decompressed neural network data, and can otherwise be arranged in any suitable and desired manner. The one or more compression codecs may be (further) operable to encode (uncompressed) neural network data to provide compressed neural network data streams. In embodiments, the one or more compression codecs operate based on neural network coordinates, e.g. substantially as described above. In embodiments, the one or more compression codecs are plural compression codecs. Different compression codecs may comprise separate circuits, or may be at least partially formed of shared processing circuits.

In embodiments, the one or more compression codecs are integrated with the cache system. Thus, in embodiments, the cache system comprises the one or more compression codecs.

The one or more compression codecs may be provided at any suitable cache level of the cache system. Different compression codecs could be provided at different cache levels, but in embodiments all of the one or more compression codecs are provided at the same cache level of the cache system. The one or more compression codecs may, for example, (all) be provided at a private cache level of the cache system, a partially shared cache level of the cache system, or a shared cache level of the cache system.

In embodiments, decompressed neural network data decoded by a compression codec is cached at the same and/or one or more lower cache levels of the cache system. Thus, in embodiments, the cache system does not include any neural network data caches at any levels of the cache system higher than the cache level at which the one or more compression codecs are provided.

The one or more compression codecs can implement any suitable and desired compression scheme. Different compression codecs may implement different compression schemes, but in embodiments all of the one or more compression codecs implement the same compression scheme.

The compression scheme may encode data in a lossless or lossy manner. For example, Arm Frame Buffer Compression (AFBC), e.g. as described in US 2013/0036290 and US 2013/0198485, the entire contents of which is hereby incorporated by reference, may be used. It would be possible to use a fixed rate compression scheme, such as Arm Fixed Rate Compression (AFRC), e.g. as described in WO 2020/115471, the entire contents of which is hereby incorporated by reference, e.g. such that a compressed data stream can be accessed in a "random access" manner. However, in embodiments a variable rate compression scheme is used, such that decoding a compressed data stream comprises processing the stream in sequence from its beginning. Other, e.g. block-based, compression schemes would be possible. In embodiments, a compression scheme optimised for neural network data is used. The compression scheme may pack compressed data streams tightly or sparsely.

In embodiments, the compression scheme is such that a (and in embodiments each) compressed neural network data stream comprises a respective header and associated compressed payload data. Payload data should, and in embodiments does, comprise compressed neural network data of interest, such as compressed feature map data and/or weight data, e.g. for a particular neural network layer or tensor. Header data, in embodiments, comprises compression information that is read as part of the payload decompression process (and that is written as part of the payload compression process). The compression information may, for example, and in embodiments, indicate a compression scheme, and/or a compression ratio, and/or a size of corresponding payload data, etc. Header data may (also) include neural network information, such as type of neural network layer (e.g., convolution, depth-wise, fully connected) encoded, etc.

Thus, in embodiments, a compression codec decoding a compressed neural network data stream comprises the compression codec first reading the header data of the data stream, and then using the read header data to decode compressed payload data of the data stream. In embodiments, payload data is arranged sequentially such that decoding payload data comprises processing the payload data in sequence (from its beginning).

As discussed above, in embodiments of the technology described herein, in response to a "cache miss" for requested neural network data, the cache system triggers a compression codec to decode at least a portion of a compressed neural network data stream that encodes the requested neural network data.

In embodiments, the arrangement in such that it is first checked to determine whether a compression codec is already processing the compressed neural network data stream in question. Thus, in embodiments, it is determined whether a compression codec of the one or more compression codecs is currently decoding a compressed neural network data stream that encodes requested neural network data. In embodiments, when it is determined that a compression codec is currently decoding a compressed neural network data stream that encodes requested neural network data, that compression codec is caused to decode a part of the compressed neural network data stream that encodes the requested neural network data. This can then avoid, e.g. having to (re-)allocate a compression codec to process the data stream in question, and thus improve efficiency.

It can be determined whether a compression codec is currently decoding a compressed neural network data stream in any suitable and desired manner. In embodiments, the data processor maintains information indicating which (if any) data stream a (and in embodiments each) compression codec is currently processing, and it is determined whether a compression codec is currently decoding a compressed neural network data stream that encodes requested neural network data by comparing the information and the request. This information is, in embodiments, maintained at a shared level of the cache system, and can take any suitable form. In embodiments, neural network data streams are identified using an identifier that identifies the neural network layer or tensor that the stream encodes data for, and the data stream that a compression codec is currently processing is indicated using the identifier for the data stream.

The cache system may comprise a suitable arrangement for collating this information for all of the compression codecs at a shared level of the cache system. In embodiments, the data processor comprises a compression codec information unit at a shared level of the cache system that is operable to maintain information indicating which (if any) data stream each compression codec is currently processing. In embodiments in which the one or more compression codecs are (only) provided at a private or partially shared cache level of the cache system, the compression codec information unit may, for example, operate as a directory or snoop filter, e.g. and be able to send and receive messages to compression codecs at lower cache levels so as to appropriately maintain the information.

In embodiments, when it is not determined that a compression codec of the one or more compression codecs is currently decoding the compressed neural network data stream in question (when it is determined that a compression codec of the one or more compression codecs is not currently decoding the compressed neural network data stream in question), a compression codec of the one or more compression codecs is allocated to decode the compressed neural network data stream. In embodiments, the allocated compression codec is then caused (by the cache system) to decode the part of the compressed neural network data stream that encodes the requested neural network data.

To facilitate this, in embodiments, the data processor comprises a compression codec allocating circuit that is operable to allocate compression codecs of the one or more compression codecs to data streams for decoding. In embodiments, the compression codec allocating circuit is provided at a shared level of the cache system.

A compression codec can be allocated to decode a compressed neural network data stream in any suitable and desired manner. In embodiments, it is determined (by the compression codec allocating circuit) whether any of the one or more compression codecs are not currently allocated to decode a compressed neural network data stream (are free), and an unallocated (free) compression codec is preferentially allocated.

In embodiments, if it is determined (by the compression codec allocating circuit) that all of the one or more compression codecs are currently allocated, a selected allocated compression codec is deallocated and appropriately re-allocated.

A compression codec can be selected for deallocation ("eviction") in any suitable and desired manner. For example, and in embodiments, a least-recently allocated compression codec may be selected for deallocation. In embodiments, a least-recently used compression codec may be selected for deallocation. For example, the compression codec that least recently received a decoding request may be selected for deallocation. In embodiments, a selection may be such that a local compression codec is more likely to be selected than a compression codec associated with another processing unit (core) of the data processor.

In embodiments, a selection may be made based on neural network traversal information. For example, and in embodiments, a selection may be such that a compression codec that is closer to the end of a stream it is processing is more likely to be selected than a compression codec that is closer to the beginning of a stream it is processing. In embodiments, a selection may be such that a compression codec that is processing a related stream is more likely to be selected than a compression codec that is processing an unrelated stream. For example, the compression codec that is processing a preceding stream in a sequence of streams may be selected for deallocation, deallocated (after completing processing the preceding stream), and then re-allocated to process the next stream in the sequence.

Once it has been determined that a compression codec is allocated to decode a compressed neural network data stream, the compression codec can be caused to decode at least a part of the compressed neural network data stream in any suitable and desired manner.

In embodiments, it is determined where in the compressed neural network data stream the compression codec is (currently) processing, and where in the compressed neural network data stream the requested data is encoded. In embodiments, when it is determined that the compression codec is behind (has not yet reached) the part of the compressed neural network data stream that encodes the requested neural network data, that triggers the compression codec to continue decoding the compressed neural network data stream to the part of the compressed neural network data stream that encodes the requested neural network data.

On the other hand, in embodiments, when it is determined that the compression codec is ahead of (has already passed) the part of the compressed neural network data stream that encodes the requested neural network, that triggers the compression codec to decode the compressed neural network data stream from the beginning of the compressed neural network data stream (e.g. from the header data or beginning of the payload data) to the part of the compressed neural network data stream that encodes the requested neural network data. This can then facilitate, in particular, arrangements in which decoding a compressed data stream necessarily comprises processing the stream in sequence from its beginning.

Thus, in embodiments, the cache system can trigger a compression codec to continue processing, or jump backwards within, a compressed neural network data stream, appropriately.

In embodiments, in the case where a compression codec is caused to continue processing, any data that is decompressed other than that which is requested is cached in (a neural network coordinate based data cache of) the cache system. The requested data may also be cached. The inventor has recognised that such other data may typically be likely to be required subsequently for processing, and therefore that it can be advantageous to cache such data. On the other hand, in embodiments, in the case where a compression codec is caused to jump backwards, any data that is decompressed other than that which is requested is discarded. The inventor has recognised that such other data may typically be unlikely to be required subsequently for processing, and therefore can be discarded.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The technology described herein is applicable to any suitable form or configuration of processor and data processing system, such as graphics processors (and systems) having a "pipelined" arrangement (in which case the graphics processor comprises a rendering pipeline). It may be applicable, for example, to tile-based graphics processors and graphics processing systems. Thus the data processor may be a tile-based graphics processor.

In an embodiment, the various functions of the technology described herein are carried out on a single data processing platform that generates and outputs data, for example for a display device.

As will be appreciated by those skilled in the art, the data processing system may include, e.g., and in an embodiment, a host processor that, e.g., executes applications that require processing by the data processor. The host processor may send appropriate commands and data to the data processor to control it to perform data processing operations and to produce data processing output required by applications executing on the host processor. To facilitate this, the host processor should, and in an embodiment does, also execute a driver for the processor and optionally a compiler or compilers for compiling (e.g. shader) programs to be executed by (e.g. a processing unit (core) of) the processor.

The processor may also comprise, and/or be in communication with, one or more memories and/or memory devices that store the data described herein, and/or store software (e.g. (shader) program) for performing the processes described herein. The processor may also be in communication with a host microprocessor, and/or with a display for displaying images based on data generated by the processor.

The technology described herein can be used for all forms of input and/or output that a data (e.g. graphics) processor may use or generate. For example, the data (e.g. graphics) processor may execute a graphics processing pipeline that generates frames for display, render-to-texture outputs, etc. The output data values from the processing are in an embodiment exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc. . . . . .

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

FIG. 1 shows a data processing system 10 which may be used to perform neural network processing. The data processing system 10 comprises one or more data processors, which in the embodiment shown include an image signal processor (ISP) 2, a central processing unit (CPU) 3, a graphics processing unit (GPU) 4, and a neural network processing unit (accelerator) (NPU) 5. In the embodiment shown, an image sensor 1 is operable to provide image data to image signal processor (ISP) 2. The image signal processor (ISP) 2 may process the image data to provide data that is suitable for use as input data for neural network processing.

The CPU 3 may be operable to control the components of the data processing system 10, for example by issuing appropriate commands. The GPU 4 may be operable to perform graphics processing, as well as more general compute processing. The NPU 5 may be a processor which is specifically configured or optimised to perform neural network processing, such as performing identification or classification of objects within images that are provided by the image sensor 1, ISP 2 or GPU 4.

Although the NPU 5 may be specifically configured for performing neural network processing, as discussed above, embodiments of the technology described herein relate to neural network processing being performed by a data processor that is not specifically configured for performing neural network processing, such ISP 2, CPU 3 or GPU 4.

The data processing system comprises an interconnect 6 which provides an interface between the various data processors (ISP, CPU, GPU and NPU) and a memory controller 7. The memory controller 7 is operable to manage memory read and write requests, and to control reading and writing of data to off-chip memory 8.

The ISP 2, CPU 3, GPU 4, NPU 5, interconnect 6 and memory controller 7, may be provided as part of a system-on-chip 9. The image sensor 1 may be located off-chip. The off-chip memory 8 may comprise a main memory which is external to the system-on-chip.

Other arrangements for the data processing system would be possible. For example, although an image sensor 1 is shown in FIG. 1 for providing input data in the form of image data, other sensors or input devices could be incorporated within the data processing system, such as for example, a sound input device. Furthermore, one or more of the illustrated data processors, such as NPU 5, may be omitted.

Figure 2:
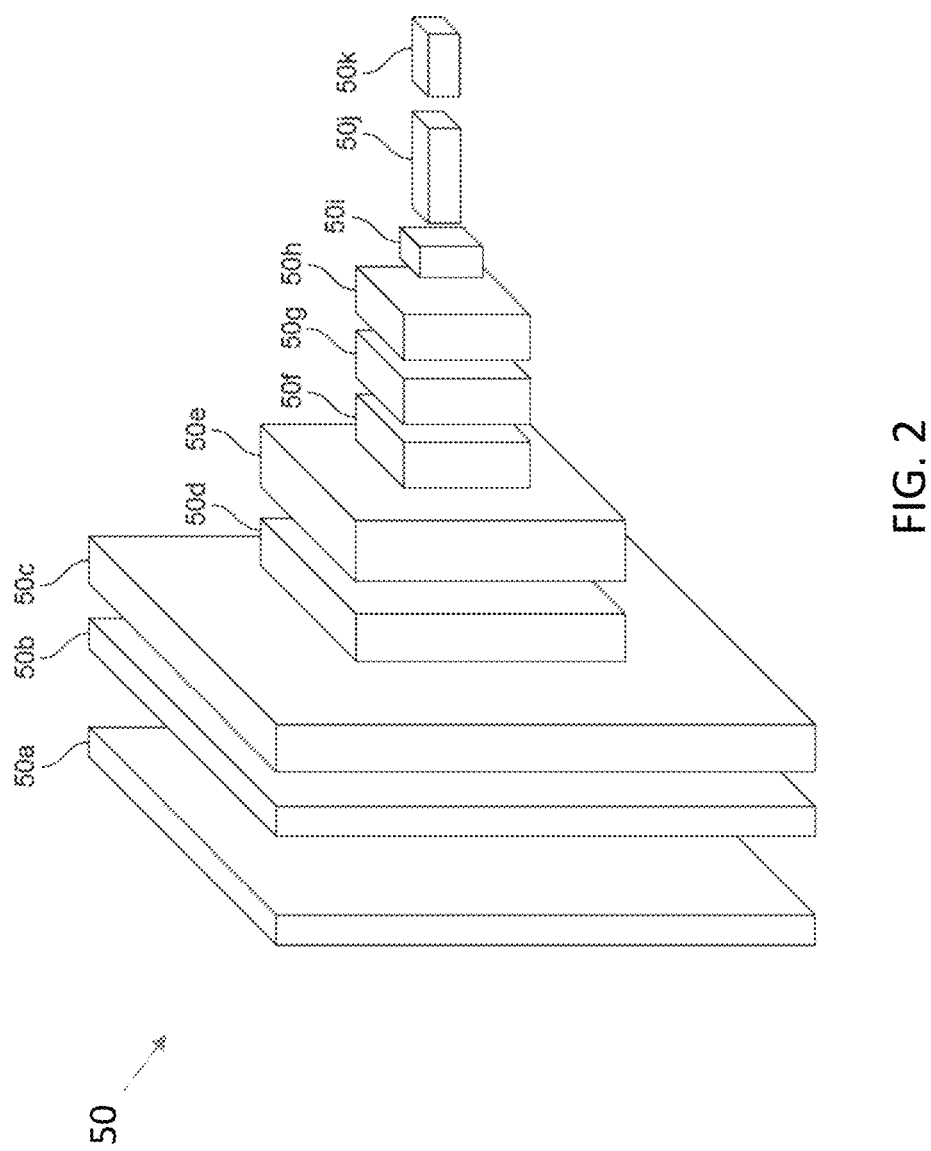
FIG. 2 shows schematically a convolutional neural network (CNN) that can be processed in embodiments of the technology described herein.

FIG. 2 illustrates an exemplary neural network 50, which may be processed by a data processor of the data processing system 10 of FIG. 1. The neural network 50 may be any suitable neural network, but in the present embodiment, the neural network is a convolutional neural network (CNN), which is the type of neural network shown in FIG. 2. The CNN comprises a number of layers 50a-50k which operate one after the other, such that the output data from one layer is used as the input data for a next layer.

The CNN shown in FIG. 2 comprises an input layer 50a. The input layer 50a receives an input data array (e.g. comprising data corresponding to image or sound data), and passes that data array on to the next layer of the neural network. The layers 50b-50i shown in FIG. 2 are convolution and/or pooling layers.

A first layer 50b may comprise a convolution layer. The convolution layer may receive data generated by the input layer 50a for use as input data. The first convolution layer may generate output data comprising an output feature map. The output feature map may comprise a representation of features that were present in the data array that was received by the convolution layer. The output feature map may be used as the input data (i.e. as an input feature map) for a subsequent layer of neural network processing.

For example, a pooling layer 50c may be provided after a convolution layer. The pooling (or "downsampling") layer may operate to reduce the size of a data array (e.g. feature map) that is input into the pooling layer. The pooling layer may produce (output) a data array (e.g. a further feature map) which is an "equivarient" representation of the data array that was input into the pooling layer (meaning that the representation is almost invariant to changes in the scale and position of features in the data array that was input into the pooling layer). The neural network may comprise further convolution layers 50d, 50f, 50g and pooling layers 50e, 50h, 50i.

Although not shown in FIG. 2, the CNN may comprise one or more further activation layers. For example, a suitable non-linearity, e.g. in the form of a Rectified Linear Unit (ReLU) function, may be applied in between a convolution layer and a pooling layer. Additionally or alternatively, the CNN may comprise one or more "deconvolution" layers, which each operate to increase the size of the data array that is input into the "deconvolution" layer, e.g. such that an output having a desired output resolution is produced.

After the various layers of the CNN, the CNN may comprise a fully connected (FC) layer 50*j*. The fully connected layer may operate on a data array (e.g. feature map) generated by prior layers. Alternatively (although not shown in FIG. 2), the neural network could comprise multiple fully connected layers. In this case, the fully connected layers may operate one after the other such that the data that is output from one fully connected layer is used as the input data for a next fully connected layer.

The final layer may produce a final output data array or output data set which may comprise a useful output (e.g. an identification or classification of an object in the, e.g. image, that was originally received by the input layer of the CNN).

The final layer passes the useful output to the output layer 50*k* of the neural network. The output layer 50*k* comprises a number of processing nodes which receive the useful output data and pass the useful output data on towards other components of the data processing system which are outside of the neural network (e.g. such as further processing and display components which can display the output data, for example).

Although FIG. 2 shows a certain number of layers, the neural network may comprise fewer or more layers if desired (and may also or instead comprise other layers which operate in a different manner to the various layers described herein).

It will be appreciated that implementing a convolutional neural network (CNN) typically requires a large number convolution and/or pooling operations to be performed. Such operations can be carried out by performing a discrete convolution between an input feature map (array) and one or more convolution (filter) kernels to generate an output feature map (array).

The input feature map may be a suitable array of data elements. One dimension of the input feature map may correspond to a "channel" dimension. For example, in the case of an input two-dimensional RGB image, the input feature map may be a three-dimensional array, with two dimensions of the array corresponding to the two dimensions of the image, and the third dimension of the array corresponding to the red, green and blue channels of the image.

A convolution (filter) kernel may be an array of data elements, with each data element of the array representing a "weight". Each weight value may be determined during training of the neural network, in any suitable manner. The size and dimensions of a convolution (filter) kernel can be selected as desired, but it should be smaller in size than the input feature map.

The output feature map may be a suitable array of data elements. Calculating the output feature map may involve a kernel "sliding" (convolving) over an input feature map, such that the kernel is positioned in a different location with respect to the input feature map for each element of the output feature map. At each location that the kernel is positioned with respect to the input feature map, the product of each weight value of the kernel with the value of the corresponding element of the input feature map (i.e. the element wise multiplication) may be calculated, and the sum of the products may be used as the corresponding output value for the output feature map. Where the input feature map comprises multiple channels, the convolution operation may be such that output values represent a sum over all of the channels, or separate outputs for different channels may be produced.

Figure 3:
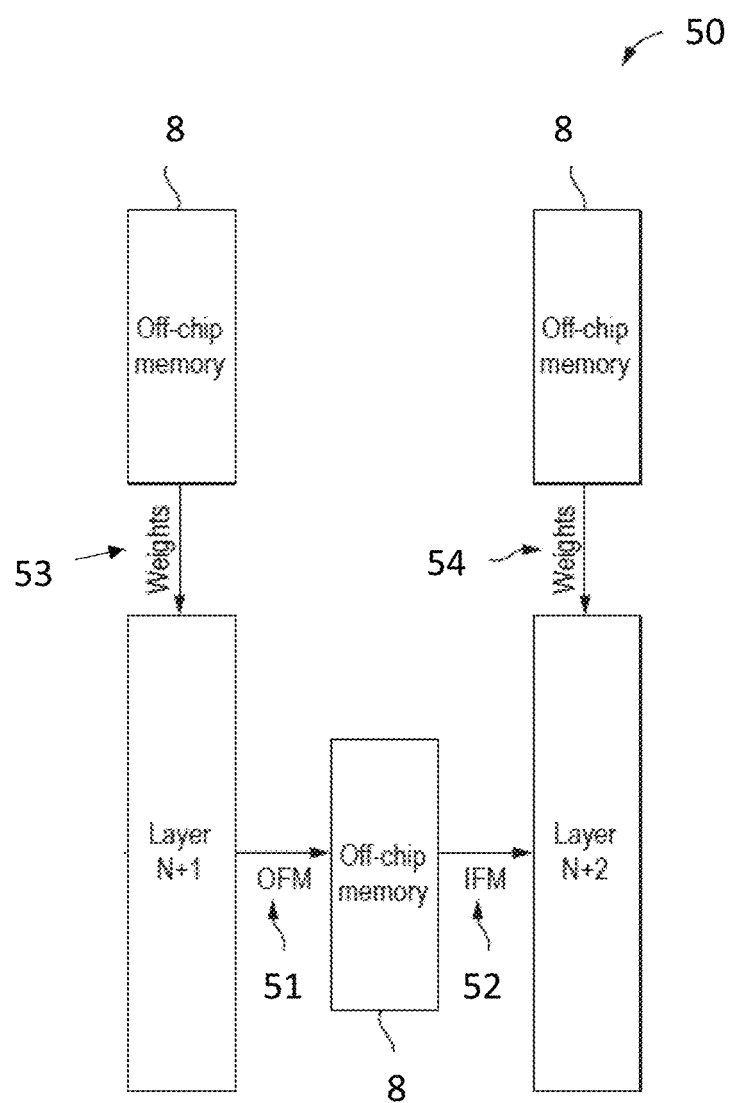
FIG. 3 shows schematically a data flow when processing a neural network in embodiments of the technology described herein.

FIG. 3 shows schematically a data flow for the layers of a neural network. The neural network shown in FIG. 3 comprises multiple layers N+1 and N+2. In the embodiment shown, layer N+1 generates a data array (tensor) which comprises an output feature map (OFM) 51, and stores OFM 51 in main memory (off-chip memory) 8. Then, when the next layer N+2 requires the data array from layer N+1 as an input feature map 52 for the neural network processing performed by layer N+2, the data array is read from off-chip memory 8. As shown in FIG. 3, each of the layers N+1, N+2 may also read processing parameters comprising weights 53, 54 (weight arrays (tensors)) from main (off-chip) memory 8.

Thus, there will be a need to transfer data between the memory 8 and the data processor (e.g. ISP, CPU, GPU) that is processing the neural network. In order to reduce the amount of data that needs to be transferred to and from memory during processing operations, the data may be stored in a compressed form in the memory 8.

In the present embodiment, compressed weights are packed into fixed size data packets (data streams) that may correspond to a memory transaction burst size, such that each data packet will contain an integer (but potentially variable) number of weight values. Each such data packet (stream) begins with a header, followed by the payload data containing the compressed weight data. The header includes metadata indicating e.g. compression parameters, a size of the compressed payload data, type of network layer (e.g., convolution, fully connected), etc. As discussed above, it would be possible to use a fixed-rate compression scheme in which compressed data can be accessed in a random access manner, but in the present embodiment decoding a compressed data stream involves processing the stream in sequence from its beginning. Feature map data may also be stored in memory 8 in a compressed form in a corresponding manner.

As a data processor (e.g. ISP, CPU, GPU) will typically need to operate on the data in an uncompressed form, data that is stored in the memory 8 in compressed form will need to be decompressed before being processed by the data processor.

It has been recognised, however, that decompression operations can consume significant processing resources. It has furthermore been recognised that it can often be the case that neural network processing will involve repeated reuse of decompressed feature map data and/or weight data. For example, in a convolution operation, a kernel of weights is repeatedly applied across an input feature map.

A data processor that is specifically configured for performing neural network processing, such as NPU 5, may accordingly be specifically configured to facilitate the efficient reuse of decompressed neural network data, so as to reduce the need to repeatedly fetch and decompress neural network data stored in compressed form in memory 8.

The inventor has recognised, however, that in the case of neural network processing being performed by a more general purpose data processor, such ISP 2, CPU 3 or GPU 4, it can be more difficult to avoid unnecessary fetching and decompressing of compressed neural network data. In particular, it can be difficult to arrange for different execution threads and/or processing cores to efficiently share and reuse decompressed neural network data.

Figure 4A:
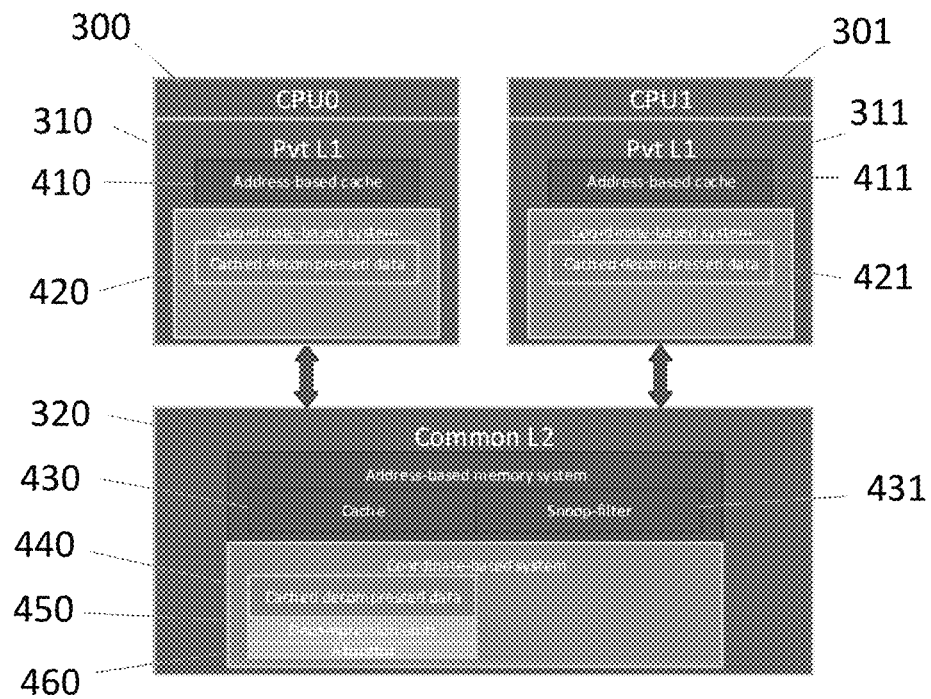
FIGS. 4A and 4B show schematically data processors in accordance with embodiments of the technology described herein.

FIG. 4A shows a data processor according to an embodiment of the technology described herein. The data processor shown in FIG. 4A is a central processing unit (CPU), but other data processors, such as a graphics processing unit (GPU) or digital signal processor (ISP), would be possible. As shown in FIG. 4A, the data processor includes multiple execution cores (execution units) 300, 301. For clarity, FIG. 4A only shows two execution cores 300, 301, but it will be appreciated that other numbers of execution cores (processing units) are possible.

As shown in FIG. 4A, the data processor further includes a cache system that is operable to transfer data from the memory system 8 to the execution cores 300, 301 of the data processor, and conversely to transfer data produced by the execution cores 300, 301 of the data processor back to the memory 8.

The cache system shown in FIG. 4A is illustrated as comprising two cache levels: a common L2 cache 320 that is closer to the memory 8, and a respective L1 cache 310, 311 associated with each execution core 300, 301 of the data processor (and from which the data is provided to the respective execution cores 310, 311). Other caches and cache levels would be possible. For example, an L3 cache may be provided in between the L2 cache 21 and memory system 8.

As shown in FIG. 4A, in this embodiment data is transferred from the memory system 8 to an L1 cache 310, 311 via the L2 cache 320, and from an L1 cache 310, 311 to the respective execution core 300, 301 (and vice-versa).

In the present embodiment, the cache system includes a "conventional" address based cache system which, as shown in FIG. 4A, includes "conventional" address based caches 410, 411 at the L1 level, and a shared conventional address based cache 430, and associated snoop filter 431, at the L2 level. The address based cache system is configured to operate substantially in a conventional manner, based on conventional memory address based tags.

For example, FIG. 7A schematically illustrates a conventional address based cache 410, 411, 430 as including an exemplary set of cache lines 700 each tagged with a respective (part of a) physical address 701 identifying the location in memory 8 where the data in the cache line is stored. Each cache line includes a respective set of cached data 703, and state data 702 indicating a state of the cache line, such as valid or invalid, etc. FIG. 7B shows another example of an address based cache, in which each cache line is tagged by a respective virtual address, together with an appropriate address space identifier (ASID) 701.

The cache system can then respond to an execution core's 300, 301 request for data that indicates a memory address, by returning data it is caching, or triggering an appropriate fetch from memory 8, e.g. in a conventional manner for the data processor in question. In the present embodiment, streams (data packets) of compressed neural network data (stored in the memory 8) are cached in compressed form by the memory address based cache system.

In the present embodiment, in addition to the conventional address based cache system, the cache system is provided with a separate neural network coordinate based cache system which, in the embodiment shown in FIG. 4A, includes neural network coordinate based data caches 420, 421 at the L1 level, and a shared neural network coordinate based data cache 440 at the L2 level.

In the present embodiment, the neural network coordinate based cache system further includes a set of decompression units 450, and a decompression unit allocator 460, at the L2 level. The decompression unit allocator 460 is operable to allocate the decompression units of the set of decompression units 450 to respective streams (data packets) of compressed neural network data for processing. For example, each decompression unit can be allocated to process a stream for a different network layer or tensor.

The neural network coordinate based cache system can accordingly decompress compressed neural network data that is cached in compressed form by the address based cache system, and cache resulting decompressed neural network data in decompressed form. Furthermore, rather than operating based on conventional memory address based tags (like the conventional address based cache system), the neural network coordinate based cache system is configured to operate based on neural network coordinates, e.g. based on layer enumeration and tensor descriptors, including traversal information.

For example, FIG. 7C shows a neural network coordinate based data cache 420, 421, 440 that includes an exemplary set of cache lines 710 each tagged with a respective coordinate 711 identifying a coordinate associated with the neural network data that the cache line is for. In the present embodiment, the coordinate tag indicates a neural network position X, Y, depth (channel) D, frame Z, and tensor (layer) identifier TID. An address space identifier ID ASID (not shown) may also or instead be used. Other arrangements would be possible. For example, a coordinate tag may have fewer or more dimensions. Each cache line includes a respective set of cached decompressed neural network data 713, and state data 712 indicating a state of the cache line, such as valid or invalid, etc. In the present embodiment, neural network coordinate based data caches 420, 421, 440 further implement a cache eviction policy that is based on knowledge of traversal of the neural network, and an appropriate invalidation mechanism that can, e.g. invalidate all entries tagged with the same TID.

The cache system can respond to an execution core's 300, 301 request for data that indicates a neural network coordinate by returning decompressed neural network data it is caching, or triggering a decompression operation to decompress the requested data. This can facilitate particularly efficient sharing and reuse of decompressed neural network data.

Figure 8:
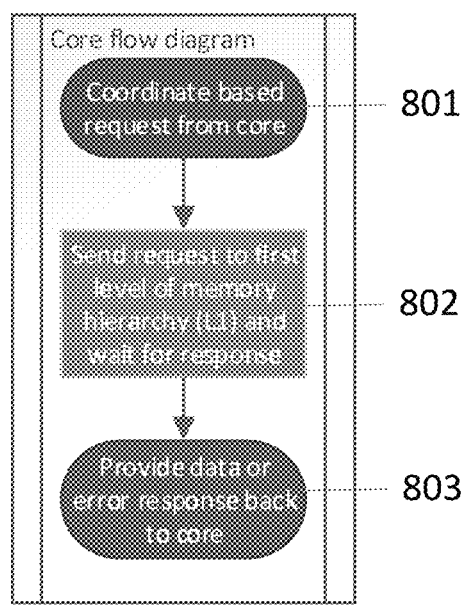
FIG. 8 shows schematically a process in accordance with embodiments of the technology described herein.
Figure 9:
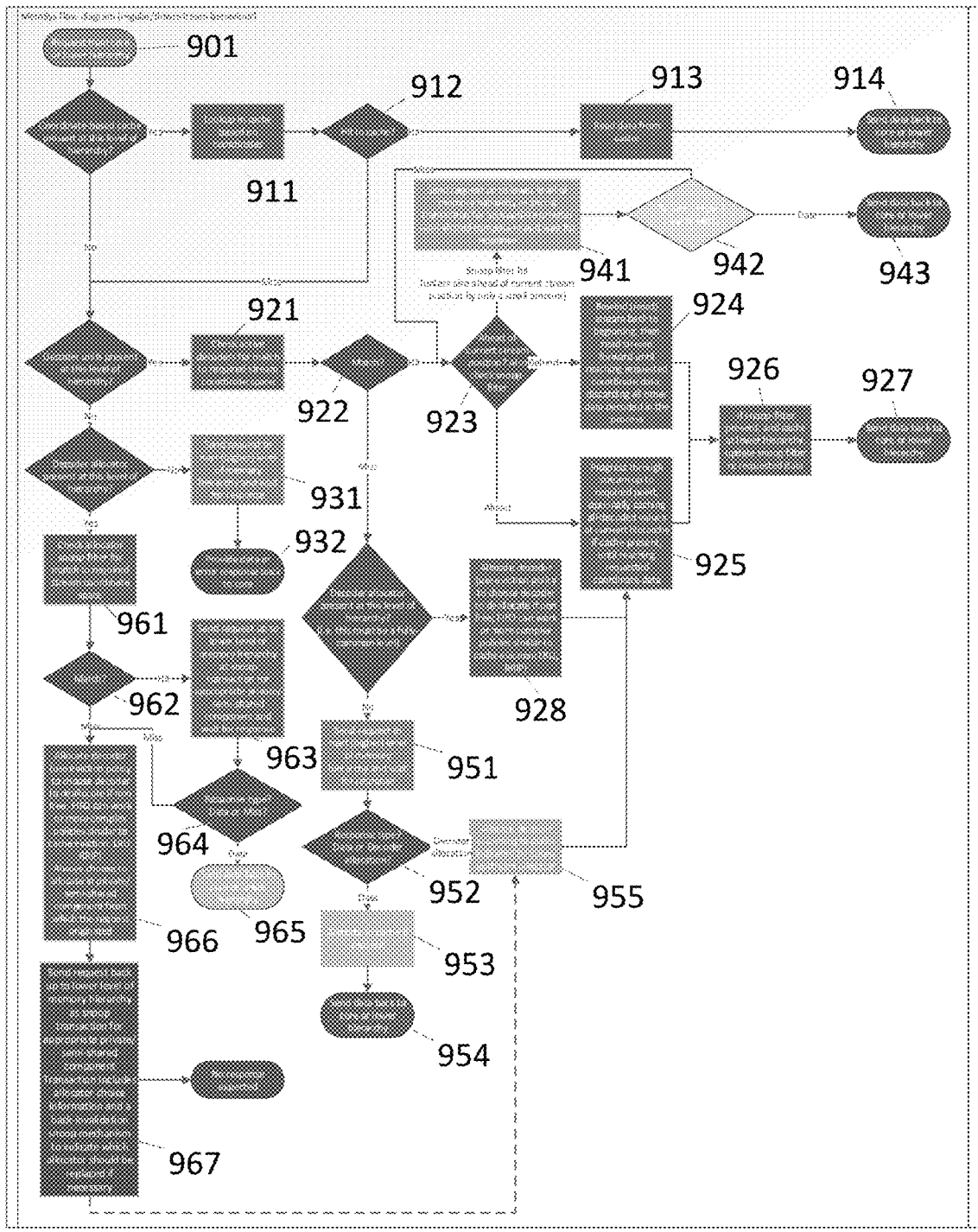
FIG. 9 shows schematically a process in accordance with embodiments of the technology described herein.

FIGS. 8 and 9 illustrate the operation of the neural network coordinate based cache system in more detail.

As illustrated in FIG. 8, when an execution core 300, 301 requires neural network data for processing, it generates a request for the data that indicates coordinates (e.g. X, Y, D, Z, TID) of the required data (at step 801), and sends the request to its local L1 cache 310, 311 and waits for a response from the cache system (at step 802), which response will include either the requested data or an error (at step 803).

FIG. 9 illustrates the operation of the cache system in response to an execution core request for neural network data. FIG. 9 illustrates how the response at a particular level of the cache system to a request for neural network data can depend on whether that cache level includes a neural network coordinate based data cache and/or a decompression unit and/or a decompression allocator. It will accordingly be appreciated that the response of the cache system will depend on the particular configuration of the cache system in question, and thus that some of the steps shown in FIG. 9 may be omitted as appropriate.

The operation of the cache system of the embodiment of FIG. 4A will now be described with reference to FIG. 9. For clarity, in the following description it is assumed that a request for neural network data is generated by execution core 300, but it will be appreciated that a request for neural network data could be generated by another execution core, and handled in a corresponding manner.

As illustrated in FIG. 9, in the present embodiment, in response to a request generated by execution core 300 for neural network data received by L1 cache 310 (at step 901), a cache lookup (at step 911) is performed to determine (at step 912) whether or not the local L1 neural network coordinate based data cache 420 includes the requested data. In the present embodiment, the cache lookup determines whether the L1 neural network coordinate based data cache 420 includes a valid cache line that is tagged with the coordinates (X, Y, D, Z, TID) indicated by the request. If the requested data is present in the local L1 neural network coordinate based data cache 420, the requested data is read (at step 913), and provided to the requesting execution core 300 (at step 914).

If, however, the requested data is not present in the local L1 neural network coordinate based data cache 420, the request is sent to the L2 level (at step 931).

Then, in response to the request for neural network data received by the L2 cache 320 (at step 901), a cache lookup (at step 911) is performed to determine (at step 912) whether or not the L2 neural network coordinate based data cache 440 includes the requested data. Again, the cache lookup determines whether the L2 neural network coordinate based data cache 440 includes a valid cache line that is tagged with the coordinates (X, Y, D, Z, TID) indicated by the request. If the requested data is present, the requested data is read (at step 913), and provided to the requesting execution core 300 (via the L1 level) (at steps 914, 932).

If, however, the requested data is not present in the L2 neural network coordinate based data cache 440, it is determined (at steps 921 and 922) whether the neural network data stream (compressed data packet) corresponding to the requested data is currently being processed by a decompression unit of the set of decompression units 450. In the present embodiment, decompression unit allocator 460 maintains allocation information indicating what (if any) neural network data stream each decompression unit is currently processing, and it is determined whether the neural network data stream corresponding to the requested data is currently being processed by comparing the coordinates indicated by the request with the allocation information maintained by the decompression unit allocator 460. In the present embodiment, neural network data streams are identified using the TID for the tensor (layer) that the stream encodes data for, and the decompression unit allocator 460 determines whether a neural network data stream is currently being processed by comparing TIDs.

If the required neural network data stream is currently being processed by a decompression unit, it is determined (at step 923) whether the required neural network data is ahead of, or behind, the decompression unit's current position in the data stream.

If the required data is ahead of the decompression unit's current position, the decompression unit is caused to continue processing the data stream up to the required data (at step 925), and cache resulting decompressed data in the L2 neural network coordinate based data cache 440. If, however, the required data is behind the decompression unit's current position, the decompression unit is caused to reset (at step 924) to the beginning of the data stream so as to (re-)read the header data for the data stream, and then (re-)process the data stream up to the required data. As discussed above, this can then facilitate decoding of a data stream that needs to be processed in sequence from its beginning. In this case, any decompressed data generated by the decompression unit other than that requested may be discarded, and so not cached in the L2 neural network coordinate based data cache 440.

The requested data is then provided to the requesting execution core 300 (via the L1 level) (at steps 927, 932).

Returning to step 922, if the required neural network data stream is not currently being processed by a decompression unit, the decompression unit allocator 460 allocates a decompression unit of the set of decompression units 450 (at step 928), and the allocated decompression unit processes the data stream up to the required data (at step 925). This may involve the compressed data stream being read into the L2 address based cache 430 from memory 8. The requested data is then provided to the requesting execution core 300 (via the L1 level) (at steps 827, 832).

The decompression unit allocator 460 may be configured to initially attempt to allocate a decompression unit that is free (that is not currently allocated). If no decompression units are free, the decompression unit allocator 460 may select a decompression unit to deallocate ("evict"), and reallocate the selected decompression unit. In this case, the least-recently allocated or least-recently used decompression unit may be selected for deallocation, or the selection may be based on neural network traversal information. For example, the selection may be such that a decompression unit that is closer to the end of the stream it is processing is more likely to be selected than a decompression unit that is closer to the beginning of the stream it is processing. Other arrangements would be possible.

Figure 4B:
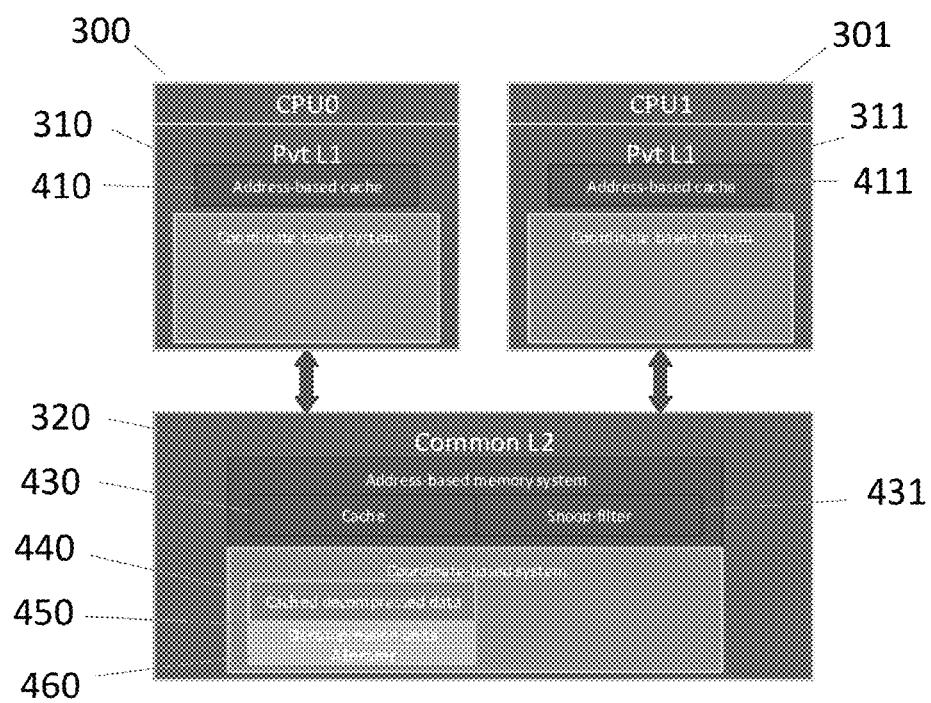

FIG. 4B shows a data processor in accordance with another embodiment. The data processor of the embodiment of FIG. 4B is configured substantially as described above for the FIG. 4A embodiment, except that neural network coordinate based data caches are not provided at the L1 level. Accordingly, in this embodiment, a request for neural network data received at the L1 level is sent to the L2 level (at step 931), without a cache lookup (steps 911-914) being performed at the L1 level.

In other embodiments, rather than the L2 neural network coordinate based data cache 440 being shared between all of the decompression units, the L2 neural network coordinate based data cache 440 includes a separate cache associated with each decompression unit. In this case, the step of determining whether the neural network data stream corresponding to the requested data is currently being processed may be performed before an L2 cache lookup step.

Figure 5A:
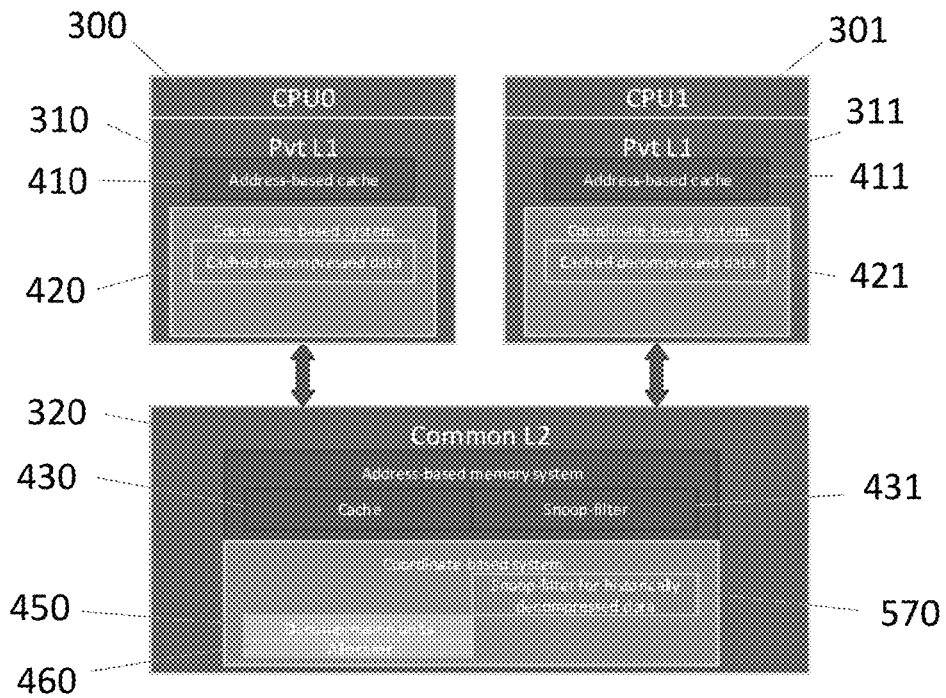
FIGS. 5A and 5B show schematically data processors in accordance with embodiments of the technology described herein.

FIG. 5A shows a data processor in accordance with another embodiment. The data processor of the embodiment of FIG. 5A is configured substantially as described above for the FIG. 4A embodiment, except that a neural network coordinate based data cache is not provided at the L2 level, and a neural network coordinate based data snoop filter 570 is provided at the L2 level, which will be described below.

The operation of the cache system of the embodiment of FIG. 5A will now be described with reference to FIG. 9. Again, in the following description it is assumed that a request for neural network data is generated by execution core 300, but it will be appreciated that a request for neural network data could be generated by another execution core, and handled in a corresponding manner.

As illustrated in FIG. 9, in the present embodiment, in response to a request generated by execution core 300 for neural network data received by L1 cache 310 (at step 901), a cache lookup (at step 911) is performed to determine (at step 912) whether or not the local L1 neural network coordinate based data cache 420 includes the requested data. If the requested data is present in the local L1 neural network coordinate based data cache 420, the requested data is read (at step 913), and provided to the requesting execution core 300 (at step 914).

If, however, the requested data is not present in the local L1 neural network coordinate based data cache 420, the request is sent to the L2 level (at step 931).

Then, in response to the request for neural network data received by the L2 cache 320 (at step 901), it is determined (at steps 921 and 922) whether the neural network data stream corresponding to the requested data is currently being processed by a decompression unit of the set of decompression units 450.

If the required neural network data stream is currently being processed by a decompression unit, it is determined (at step 923) whether the required neural network data is ahead of, or behind, the decompression unit's current position in the data stream.

In the present embodiment, the neural network data snoop filter 570 maintains coherency information indicating what data is validly present in each L1 neural network coordinate based data cache 420, 421, and it is also determined (at step 923) whether the neural network data snoop filter 570 indicates that the requested data is validly present in another L1 neural network coordinate based data cache 421 (i.e. a L1 neural network coordinate based data cache other than that associated with the requesting execution core 300).

If the neural network data snoop filter 570 does indicate that the requested data is validly present in another L1 neural network coordinate based data cache 421, a request for the data is sent to that L1 neural network coordinate based data cache 421 (at step 941), and the L1 neural network coordinate based data cache 421 responds (at step 942) either with the requested data or to indicate that the requested data is not validly present. If the L1 neural network coordinate based data cache 421 responds with the requested data, the requested data is provided to the requesting execution core 300 (via the L1 level) (at steps 943, 932). The neural network data snoop filter 570 may also be updated to indicate that the requested data is now validly present in multiple L1 neural network coordinate based data caches 420, 421.

Otherwise, if the requested data is not validly present in another L1 neural network coordinate based data cache 421, the decompression unit either resets to the beginning of the data stream (at step 924), or continues to process the data stream up to the required data (at step 925), as described above for the FIG. 4A embodiment. The neural network coordinate based data snoop filter 570 is updated (at step 926), and the requested data is provided to the requesting execution core 300 (via the L1 level) (at steps 927, 932).

Returning to step 922, if the required neural network data stream is not currently being processed by a decompression unit, the decompression unit allocator 460 allocates a decompression unit of the set of decompression units 450 (at step 928) (e.g. as described above), and the allocated decompression unit processes the data stream up to the required data (at step 925). The neural network data snoop filter 570 is updated (at step 926), and the requested data is provided to the requesting execution core 300 (via the L1 level) (at steps 927, 932).

Figure 5B:
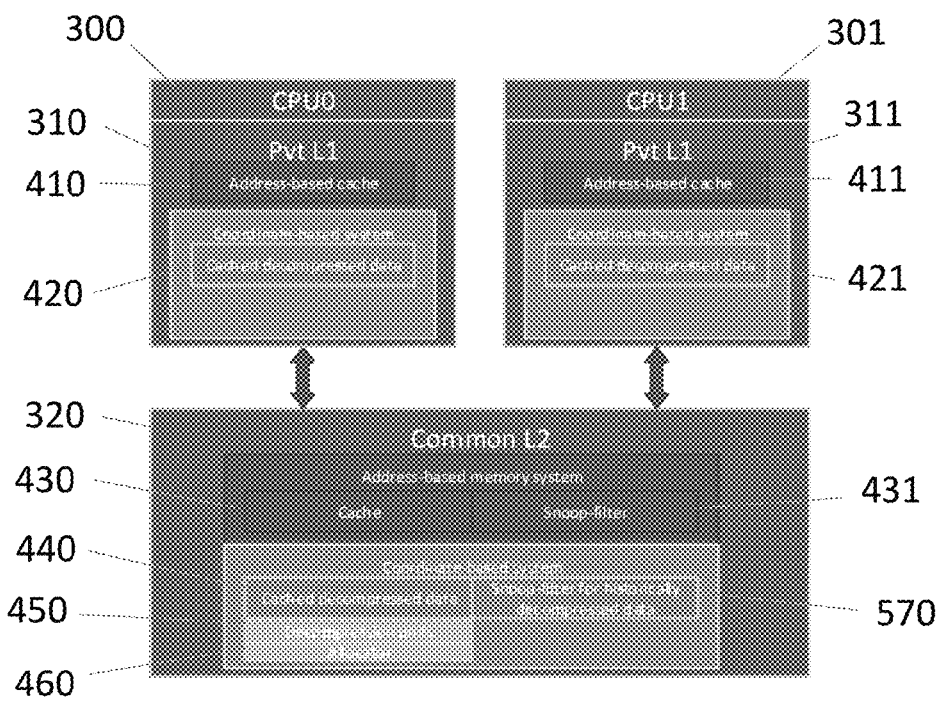

FIG. 5B shows a data processor in accordance with another embodiment. The data processor of the embodiment of FIG. 5B is configured substantially as described above for the FIG. 5A embodiment, except that a neural network coordinate based cache is provided at the L2 level. Accordingly, in this embodiment, a cache lookup (steps 911-914) is performed at the L2 level, e.g. as described above for the FIG. 4A embodiment.

Figure 10:
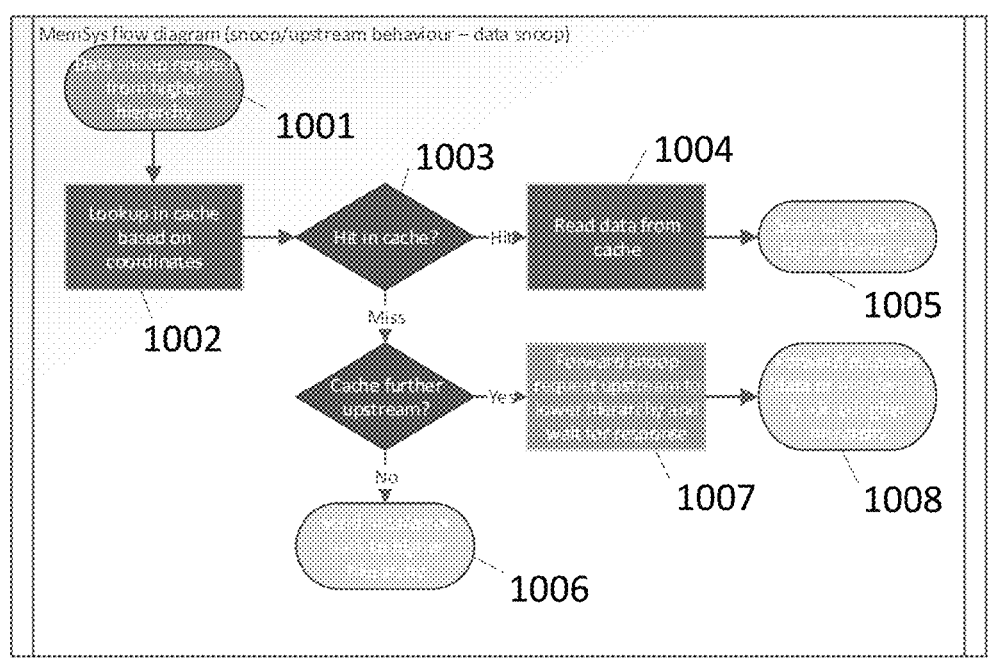
FIG. 10 shows schematically a process in accordance with embodiments of the technology described herein.

FIG. 10 shows the data snoop process of steps 941-943 in more detail. As shown in FIG. 10, in response to a request for data being received at the L1 level from the L2 level (at step 1001), a cache lookup (at step 1002) is performed to determine (at step 1003) whether or not the L1 neural network coordinate based data cache 421 includes the requested data. If the requested data is present in the L1 neural network coordinate based data cache 421, the requested data is read (at step 1004), and returned to the L2 level (at step 1005). If, however, the requested data is not present in the L1 neural network coordinate based data cache 421, it is indicated to the L2 level that the requested data is not validly present (at step 1006).

FIG. 10 also illustrates the case where the cache system includes an (even) lower cache level, in which case a cache miss (at step 1003) can trigger a cache lookup at the (even) lower cache level (at steps 1007, 1008).

The use of a snoop process in accordance with these embodiments can reduce the chances of a decompression unit being caused to reset to the beginning of a data stream, e.g. as compared to the embodiments described above with reference to FIG. 4. This may be advantageous where resetting is likely to result in undesirable processing delays, such as in the case of decoding feature map data where it is necessary to decode a data stream in sequence from its beginning. Where resets are unlikely to have significant impact, such as in the case of decoding weight data, it may be advantageous to employ a less complex arrangement, such as described above with reference to FIG. 4.

Figure 6:
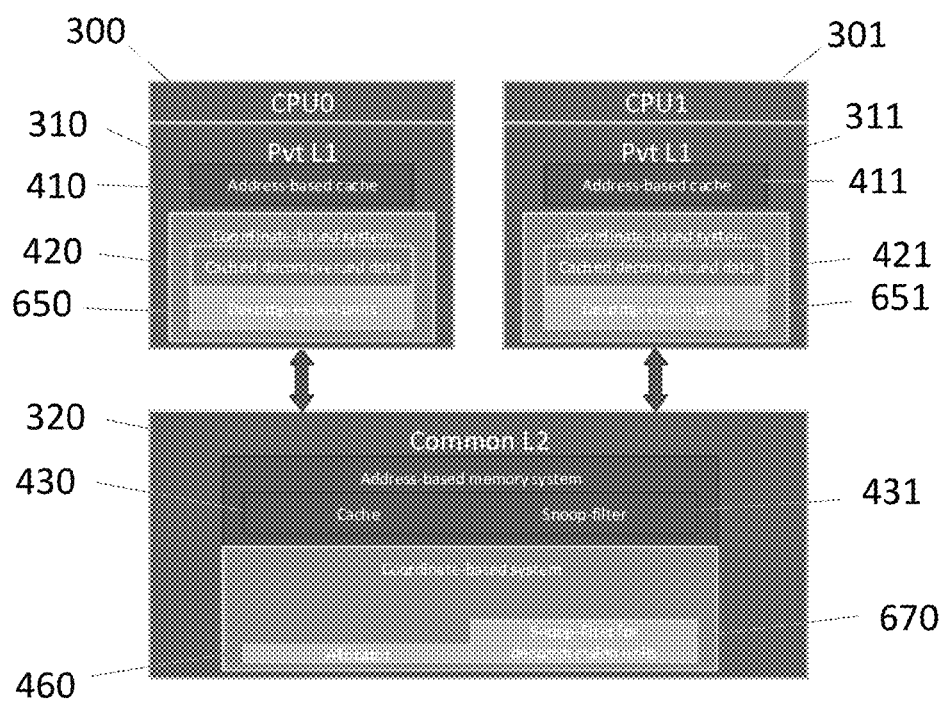
FIG. 6 shows schematically a data processor in accordance with embodiments of the technology described herein.

FIG. 6 shows a data processor in accordance with another embodiment. The data processor of the embodiment of FIG. 6 is configured substantially as described above for the FIG. 4A embodiment, except that respective sets of one or more local decompression units 650, 651 are provided at the L1 level, rather than a single shared set of decompression units at the L2 level. Furthermore, a neural network coordinate based data cache is not provided at the L2 level, and a decompression unit snoop filter 670 is provided at the L2 level, which will be described below.

The operation of the cache system of the embodiment of FIG. 6 will now be described with reference to FIG. 9. Again, in the following description it is assumed that a request for neural network data is generated by execution core 300, but it will be appreciated that a request for neural network data could be generated by another execution core, and handled in a corresponding manner.

As illustrated in FIG. 9, in the present embodiment, in response to a request generated by execution core 300 for neural network data received by L1 cache 310 (at step 901), a cache lookup (at step 911) is performed to determine (at step 912) whether or not the local L1 neural network coordinate based data cache 420 includes the requested data. If the requested data is present in the local L1 neural network coordinate based data cache 420, the requested data is read (at step 913), and provided to the requesting execution core 300 (at step 914).

If, however, the requested data is not present in the local L1 neural network coordinate based data cache 420, it is determined (at steps 921 and 922) whether the neural network data stream corresponding to the requested data is currently being processed by a decompression unit of the local set of decompression units 650.

If the required neural network data stream is currently being processed by a decompression unit of the local set of decompression units 650, it is determined (at step 923) whether the required neural network data is ahead of, or behind, the decompression unit's current position in the data stream, and the decompression unit either resets to the beginning of the data stream (at step 924), or continues to process the data stream up to the required data (at step 925), as described above for the FIG. 4A embodiment. The requested data then is provided to the requesting execution core 300 (at step 927).

Returning to step 922, if the required neural network data stream is not currently being processed by a decompression unit of the local set of decompression units 650, the request is sent to the L2 level (at step 951).

In the present embodiment, the decompression unit snoop filter 670 maintains information indicating what compressed data stream each L1 level decompression unit is currently processing, and in response to the request for neural network data received by the L2 cache 320 (at step 901), it is determined (at steps 961 and 962) whether the decompression unit snoop filter 670 indicates that the required neural network data stream is currently being processed by a decompression unit of another set of decompression units 651 (i.e. a decompression unit that is not associated with the requesting execution core 300).

If the decompression unit snoop filter 670 does indicate that the required neural network data stream is currently being processed by a decompression unit of another set of decompression units 651, a request is sent to that set of decompression units 651 (at step 963), which responds (at step 964) either with the requested data or to indicate that the requested data is not available.

If the requested data is returned, the data is sent to the L1 level 310 associated with the requesting execution core 300 (at steps 965, 952), the respective L1 neural network coordinate based data cache 420 is updated appropriately (at step 953), and the requested data is provided to the requesting execution core 300 (at step 954).

Otherwise, if the required neural network data stream is not currently being processed by a decompression unit, the decompression unit allocator 460 allocates a decompression unit of the local set of decompression units 650 (at step 966), and an allocation request is sent to the allocated decompression unit (at steps 967, 952) which triggers the decompression unit (at step 955) to process the data stream up to the required data (at step 925). The requested data is then provided to the requesting execution core 300 (at step 927).

Figure 11:
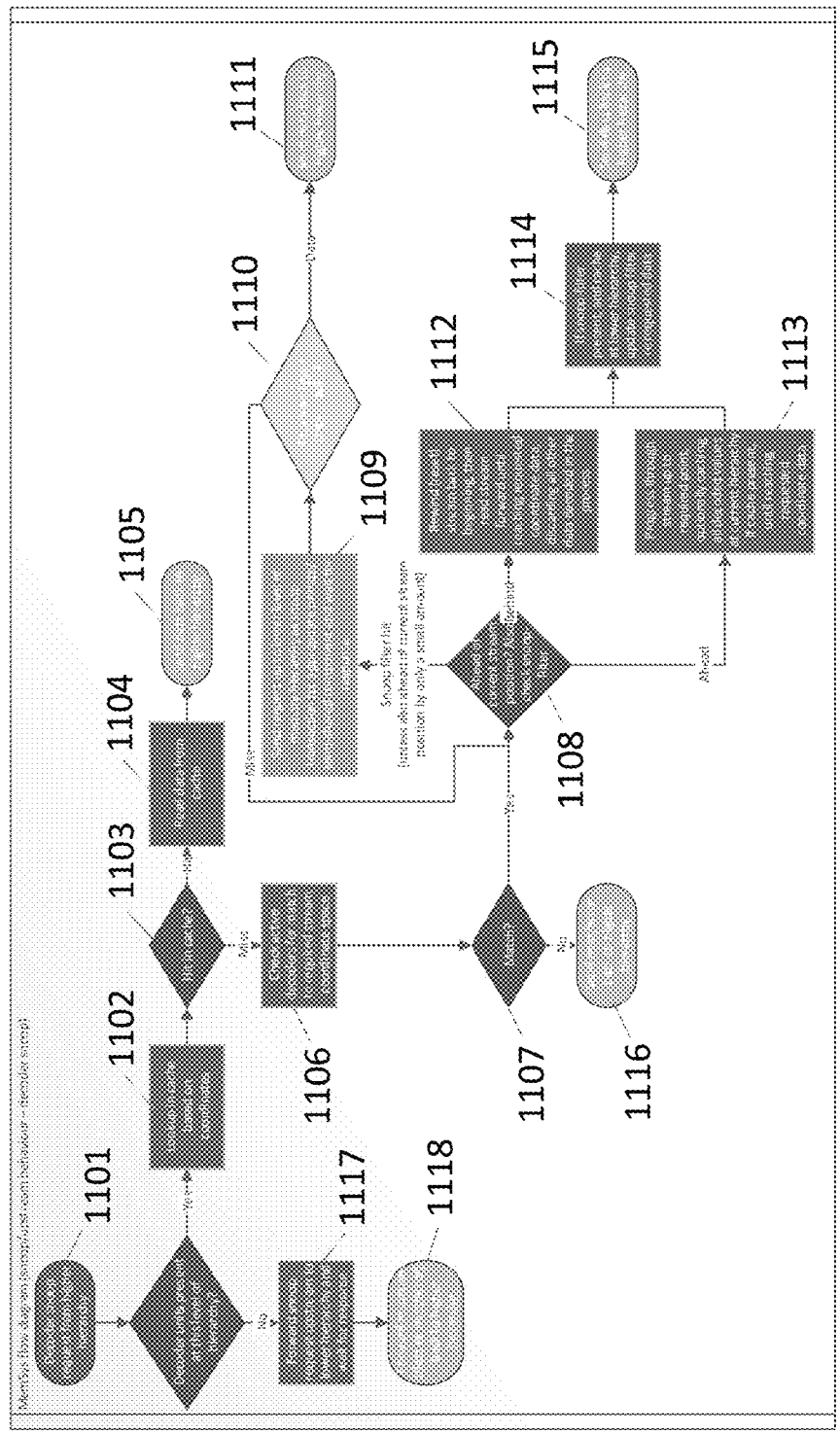
FIG. 11 shows schematically a process in accordance with embodiments of the technology described herein.

FIG. 11 shows the decompression unit snoop process of steps 963-965 in more detail. As shown in FIG. 11, in response to a request being received at the L1 level from the L2 level (at step 1101), a cache lookup (at step 1102) may be performed to determine (at step 1103) whether or not the L1 neural network coordinate based data cache 421 includes the requested data. If the requested data is present in the L1 neural network coordinate based data cache 421, the requested data is read (at step 1104), and returned to the L2 level (at step 1105).

If, however, the requested data is not present in the L1 neural network coordinate based data cache 421, it is determined (at steps 1106 and 1107) whether the neural network data stream corresponding to the requested data is currently being processed by a decompression unit of the local set of decompression units 651.

If the required neural network data stream is currently being processed by a decompression unit of the local set of decompression units 651, it is determined (at step 1108) whether the required neural network data is ahead of, or behind, the decompression unit's current position in the data stream.

As shown in FIG. 11, it may also be determined (at step 1108) whether a neural network data snoop filter indicates that the requested data is validly present in another neural network coordinate based data cache, and if so a request for the data may be sent to that cache (at step 1109), which cache may respond (at step 1110) with the requested data or to indicate that the requested data is not validly present, e.g. substantially as described above. If the requested data is returned, it is returned to the L2 level (at step 1111).

Otherwise, the decompression unit either resets to the beginning of the data stream (at step 1112), or continues to process the data stream up to the required data (at step 1113), e.g. as described above. The neural network data snoop filter may be updated (at step 1114), and the requested data is returned to the L2 level (at step 1115).

Returning to step 1107, if the required neural network data stream is not currently being processed by a decompression unit of the local set of decompression units 651, and indication of this is returned to the L2 level (at step 1116).

FIG. 11 also illustrates the case where decompression units are present at an (even) lower cache level, in which case a received request may be sent to the (even) lower cache level (at steps 1117, 1118).

Figure 12A:
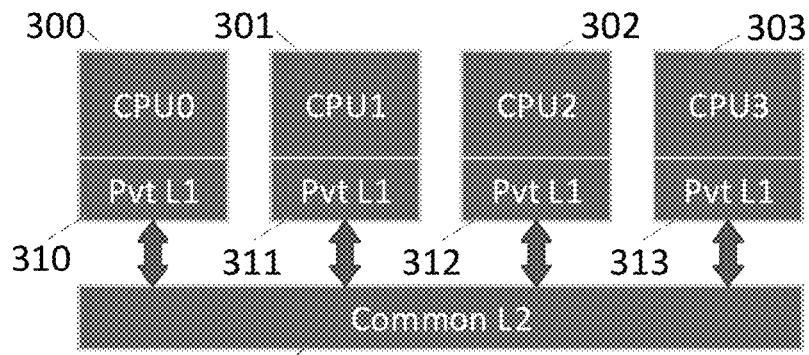
FIGS. 12A, 12B and 12C show schematically data processors in accordance with embodiments of the technology described herein.

The above embodiments relate to a data processor arranged substantially as shown in FIG. 12A. FIG. 12A, shows a data processor that includes four execution cores (execution units) 300-303 that each have access to a respective private L1 cache 310-313. Other numbers of execution cores would be possible. Each of the L1 caches 310-313 is in communication with a common L2 cache 320, which is in communication with main memory 8 (not shown).

However, other arrangements are possible.

Figure 12B:
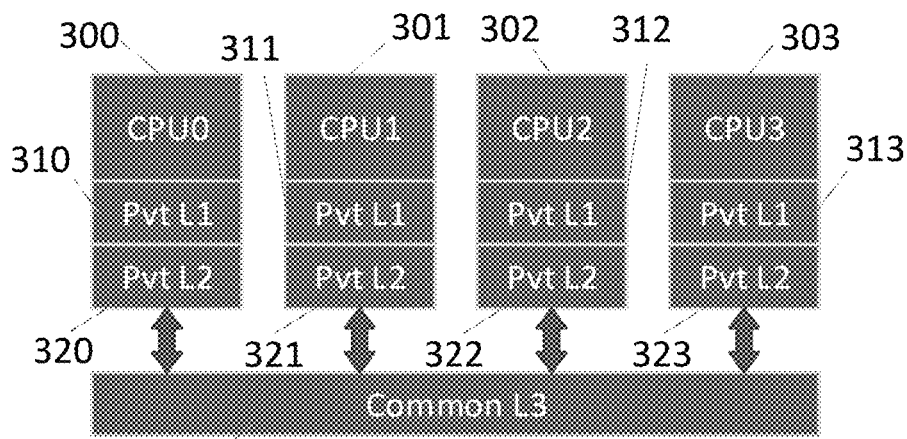

For example, FIG. 12B illustrates an embodiment in which each CPU 300-303 is associated with a respective private L1 cache 310-313 and a respective private L2 cache 320-323, with a common L3 cache 330 being provided.

Figure 12C:
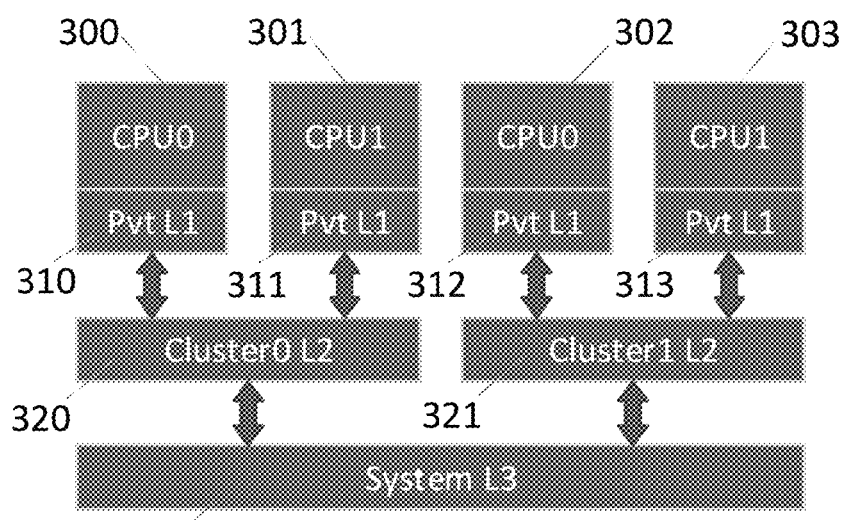

FIG. 12C illustrates an embodiment in which each CPU 300-303 is associated with a respective private L1 cache 310-313, two of the L1 caches 310, 311 are in communication with a first L2 cache 320, and the other two L1 caches 312, 313 are in communication with a second L2 cache 321, with the L2 caches 320, 321 being in communication with common L3 cache 330.

Figure 13:
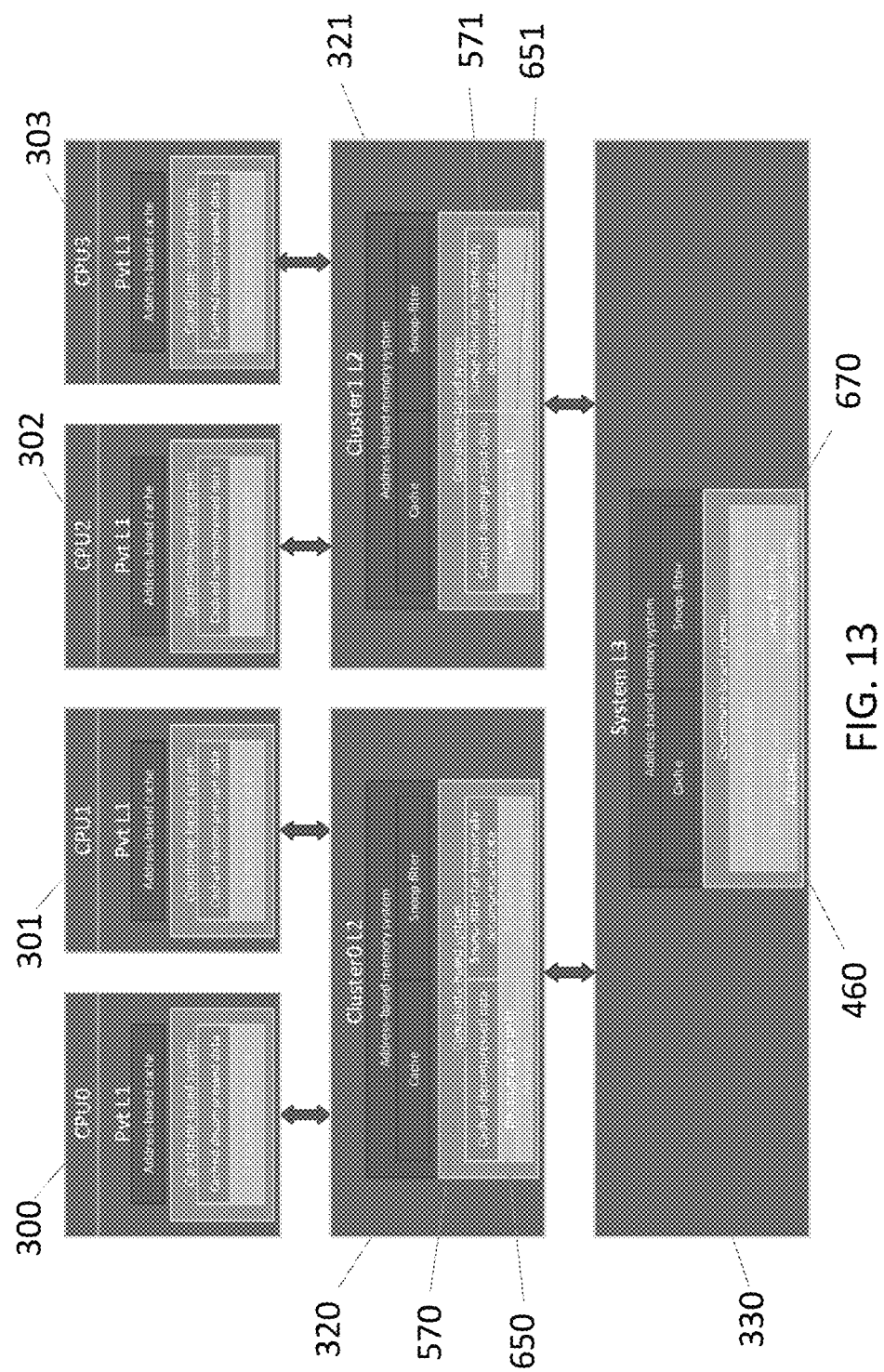
FIG. 13 shows schematically a data processor in accordance with embodiments of the technology described herein.

FIG. 13 illustrates an example of the FIG. 12C arrangement, in accordance with an embodiment. As shown in FIG. 13, in this embodiment neural network coordinate based data caches are provided at the L1 and L2 levels, respective sets of one or more decompression units 650, 651 and neural network data snoop filters 570, 571 are provided at the L2 level, and a decompression unit allocator 460 and decompression unit snoop filter 670 are provided at the L3 level. Other arrangements would be possible.

The above embodiments have been generally described with reference to the data processor reading in data from memory 8, and thus generally describes processing read-only data, such as weight data. However, it will be appreciated that the data processor may also write out data, such as feature map data, to memory 8. In this case, the cache system may include one or more compression units, and the data may be maintained coherently by appropriate coherency (invalidation) mechanisms.

It will be appreciated from the above that the technology described herein, in its embodiments at least, provides arrangements in which decompressed neural network data can be efficiently shared and reused. This is achieved, in the embodiments of the technology described herein at least, by integrating decompression units into a cache system, such that the cache system can trigger appropriate decompression operations of compressed neural network data streams.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a data processor that comprises:
one or more processing units operable to process neural network data;
a cache system operable to cache neural network data for the one or more processing units; and
one or more compression codecs operable to decode compressed neural network data streams encoding neural network data to provide decompressed neural network data;
the method comprising, when a processing unit of the one or more processing units requires neural network data for processing:
the processing unit issuing a request for the neural network data to the cache system, and the cache system in response to the request:
determining whether the requested neural network data is cached in the cache system in decompressed form; and
when it is not determined that the requested neural network data is cached in the cache system in decompressed form:
causing a compression codec of the one or more compression codecs to decode a part of a compressed neural network data stream that encodes the requested neural network data so as to provide the requested neural network data in decompressed form;
caching the requested neural network data in decompressed form in the cache system; and
providing the requested neural network data to the processing unit; and
when it is determined that the requested neural network data is cached in the cache system in decompressed form:
providing the requested neural network data to the processing unit without triggering any of the one or more compression codecs;
wherein causing a compression codec of the one or more compression codecs to decode a part of a compressed neural network data stream that encodes the requested neural network data comprises:
determining whether a compression codec of the one or more compression codecs is currently decoding the compressed neural network data stream that encodes the requested neural network data; and
when it is determined that a compression codec of the one or more compression codecs is currently decoding the compressed neural network data stream that encodes the requested neural network data:

determining whether the compression codec that is currently decoding the compressed neural network data stream is ahead of or behind the part of the compressed neural network data stream that encodes the requested neural network data; and when it is determined that the compression codec is behind the part of the compressed neural network data stream that encodes the requested neural network data:
causing the compression codec to continue decoding the compressed neural network data stream to the part of the compressed neural network data stream that encodes the requested neural network data; and when it is determined that the compression codec is ahead of the part of the compressed neural network data stream that encodes the requested neural network data:
causing the compression codec to decode the compressed neural network data stream from the beginning of the compressed neural network data stream to the part of the compressed neural network data stream that encodes the requested neural network data.

2. The method of claim 1, wherein the one or more compression codecs are plural compression codecs, and the method comprises:
when it is not determined that a compression codec of the plural compression codecs is currently decoding the compressed neural network data stream that encodes the requested neural network data:
allocating a compression codec of the plural compression codecs to decode the compressed neural network data stream that encodes the requested neural network data; and
causing the allocated compression codec to decode the part of the compressed neural network data stream that encodes the requested neural network data.

3. The method of claim 1, comprising:
when it is determined that the compression codec is behind the part of the compressed neural network data stream that encodes the requested neural network data:
causing the compression codec to continue decoding the compressed neural network data stream to the part of the compressed neural network data stream that encodes the requested neural network data so as to provide decompressed neural network data that includes the requested neural network data; and
caching the decompressed neural network data other than the requested neural network data; and when it is determined that the compression codec is ahead of the part of the compressed neural network data stream that encodes the requested neural network data:
causing the compression codec to decode the compressed neural network data stream from the beginning of the compressed neural network data stream to the part of the compressed neural network data stream that encodes the requested neural network data so as to provide decompressed neural network data that includes the requested neural network data; and
discarding the decompressed neural network data other than the requested neural network data.

4. The method of claim 1, wherein:
the cache system includes one or more neural network coordinate based caches operable to tag cache entries using tags that are based on one or more neural network coordinates;
the processing unit issuing a request for the neural network data to the cache system comprises the processing unit issuing a request for the neural network data to the cache system that indicates one or more neural network coordinates associated with the requested neural network data; and
determining whether the requested neural network data is cached in the cache system comprises determining whether the one or more neural network coordinate based caches include a cache entry that is tagged using a tag that corresponds to the one or more neural network coordinates indicated by the request.

5. The method of claim 4, wherein:
the cache system further includes one or more memory address based caches operable to tag cache entries using tags that are based on memory addresses; and the method comprises:
caching neural network data in compressed form in one or more first cache entries of one or more of the one or more memory address based caches, and tagging the one or more first cache entries using one or more tags that are based on memory addresses; and
caching neural network data in decompressed form in one or more second cache entries of one or more of the one or more neural network coordinate based caches, and tagging the one or more second cache entries using one or more tags that are based on one or more neural network coordinates.

6. The method of claim 1, wherein the data processor is a graphics processing unit, or a central processing unit, or a digital signal processor, or a neural network processing unit.

7. A data processor comprising:
one or more processing units operable to process neural network data;
a cache system operable to cache neural network data for the one or more processing units; and
one or more compression codecs operable to decode compressed neural network data streams encoding neural network data to provide decompressed neural network data;
wherein the one or more processing units are configured to, when neural network data is required for processing, issue a request for the neural network data to the cache system; and
the cache system is configured to, in response to a request for neural network data from a processing unit of the one or more processing units:
determine whether the requested neural network data is cached in the cache system in decompressed form; and
when it is not determined that the requested neural network data is cached in the cache system in decompressed form:
cause a compression codec of the one or more compression codecs to decode a part of a compressed neural network data stream that encodes the requested neural network data so as to provide the requested neural network data in decompressed form;
cache the requested neural network data in decompressed form in the cache system; and
provide the requested neural network data to the processing unit; and
when it is determined that the requested neural network data is cached in the cache system in decompressed form:
provide the requested neural network data to the processing unit without triggering any of the one or more compression codecs;
the cache system is configured to cause a compression codec of the one or more compression codecs to decode a part of a compressed neural network data stream that encodes the requested neural network data by:
determining whether a compression codec of the one or more compression codecs is currently decoding the compressed neural network data stream that encodes the requested neural network data; and
when it is determined that a compression codec of the one or more compression codecs is currently decoding the compressed neural network data stream that encodes the requested neural network data:
determining whether the compression codec that is currently decoding the compressed neural network data stream is ahead of or behind the part of the compressed neural network data stream that encodes the requested neural network data; and
when it is determined that the compression codec is behind the part of the compressed neural network data stream that encodes the requested neural network data:
causing the compression codec to continue decoding the compressed neural network data stream to the part of the compressed neural network data stream that encodes the requested neural network data; and
when it is determined that the compression codec is ahead of the part of the compressed neural network data stream that encodes the requested neural network data:
causing the compression codec to decode the compressed neural network data stream from the beginning of the compressed neural network data stream to the part of the compressed neural network data stream that encodes the requested neural network data.

8. The data processor of claim 7, wherein the one or more compression codecs are plural compression codecs, and the cache system is configured to cause a compression codec of the one or more compression codecs to decode a part of a compressed neural network data stream that encodes the requested neural network data by:
when it is not determined that a compression codec of the plural compression codecs is currently decoding the compressed neural network data stream that encodes the requested neural network data:
allocating a compression codec of the plural compression codecs to decode the compressed neural network data stream that encodes the requested neural network data; and
causing the allocated compression codec to decode the part of the compressed neural network data stream that encodes the requested neural network data.

9. The data processor of claim 7, wherein the cache system is configured to:
when it is determined that the compression codec is behind the part of the compressed neural network data stream that encodes the requested neural network data:

cause the compression codec to continue decoding the compressed neural network data stream to the part of the compressed neural network data stream that encodes the requested neural network data so as to provide decompressed neural network data that includes the requested neural network data; and cache the decompressed neural network data other than the requested neural network data; and when it is determined that the compression codec is ahead of the part of the compressed neural network data stream that encodes the requested neural network data:

cause the compression codec to decode the compressed neural network data stream from the beginning of the compressed neural network data stream to the part of the compressed neural network data stream that encodes the requested neural network data so as to provide decompressed neural network data that includes the requested neural network data; and discard the decompressed neural network data other than the requested neural network data.

10. The data processor of claim 7, wherein:

the cache system includes one or more neural network coordinate based caches operable to tag cache entries using tags that are based on one or more neural network coordinates;

the one or more processing units are configured to, when neural network data is required for processing, issue a request for the neural network data to the cache system that indicates one or more neural network coordinates associated with the requested neural network data; and the cache system is configured to determine whether the requested neural network data is cached in the cache system by determining whether the one or more neural network coordinate based caches include a cache entry that is tagged using a tag that corresponds to the one or more neural network coordinates indicated by the request.

11. The data processor of claim 10, wherein:

the cache system further includes one or more memory address based caches operable to tag cache entries using tags that are based on memory addresses; and the cache system is configured to:

cache neural network data in compressed form in one or more first cache entries of one or more of the one or more memory address based caches, and tag the one or more first cache entries using one or more tags that are based on memory addresses; and cache neural network data in decompressed form in one or more second cache entries of one or more of the one or more neural network coordinate based caches, and tag the one or more second cache entries using one or more tags that are based on one or more neural network coordinates.

12. The data processor of claim 7, wherein the data processor is a graphics processing unit, or a central processing unit, or a digital signal processor, or a neural network processing unit.

13. A non-transitory computer readable storage medium storing software code which when executing on a processor performs a method of operating a data processor that comprises:

one or more processing units operable to process neural network data;

a cache system operable to cache neural network data for the one or more processing units; and one or more compression codecs operable to decode compressed neural network data streams encoding neural network data to provide decompressed neural network data;

the method comprising, when a processing unit of the one or more processing units requires neural network data for processing:

the processing unit issuing a request for the neural network data to the cache system, and the cache system in response to the request:

determining whether the requested neural network data is cached in the cache system in decompressed form; and when it is not determined that the requested neural network data is cached in the cache system in decompressed form:

causing a compression codec of the one or more compression codecs to decode a part of a compressed neural network data stream that encodes the requested neural network data so as to provide the requested neural network data in decompressed form;

caching the requested neural network data in decompressed form in the cache system; and providing the requested neural network data to the processing unit; and when it is determined that the requested neural network data is cached in the cache system in decompressed form:

providing the requested neural network data to the processing unit without triggering any of the one or more compression codecs;

wherein causing a compression codec of the one or more compression codecs to decode a part of a compressed neural network data stream that encodes the requested neural network data comprises:

determining whether a compression codec of the one or more compression codecs is currently decoding the compressed neural network data stream that encodes the requested neural network data; and when it is determined that a compression codec of the one or more compression codecs is currently decoding the compressed neural network data stream that encodes the requested neural network data:

determining whether the compression codec that is currently decoding the compressed neural network data stream is ahead of or behind the part of the compressed neural network data stream that encodes the requested neural network data; and when it is determined that the compression codec is behind the part of the compressed neural network data stream that encodes the requested neural network data:

causing the compression codec to continue decoding the compressed neural network data stream to the part of the compressed neural network data stream that encodes the requested neural network data; and when it is determined that the compression codec is ahead of the part of the compressed neural network data stream that encodes the requested neural network data:

causing the compression codec to decode the compressed neural network data stream from the beginning of the compressed neural network data stream to the part of the compressed neural network data stream that encodes the requested neural network data.

\* \* \* \* \*